United States Patent
Holmes, IV

(10) Patent No.: US 12,365,148 B2
(45) Date of Patent: Jul. 22, 2025

(54) COMPOSITE PRODUCTS AND RELATED METHODS FOR MANUFACTURING COMPOSITE PRODUCTS FROM RECYCLED COMPOSITE MATERIALS

(71) Applicant: Greentex Solutions, LLC, Charleston, SC (US)

(72) Inventor: James C. Holmes, IV, Mt. Pleasant, SC (US)

(73) Assignee: Greentex Solutions, LLC, Charleston, SC (US)

( * ) Notice: Subject to any disclaimer, the term of this patent is extended or adjusted under 35 U.S.C. 154(b) by 0 days.

(21) Appl. No.: 18/766,063

(22) Filed: Jul. 8, 2024

(65) Prior Publication Data
US 2024/0359412 A1    Oct. 31, 2024

Related U.S. Application Data

(63) Continuation-in-part of application No. 17/104,065, filed on Nov. 25, 2020, now Pat. No. 12,030,263,
(Continued)

(51) Int. Cl.
*B29C 70/12* (2006.01)
*B29C 70/34* (2006.01)
(Continued)

(52) U.S. Cl.
CPC ............ *B29C 70/345* (2013.01); *B29C 70/12* (2013.01); *D04H 1/4242* (2013.01); *D04H 1/58* (2013.01);
(Continued)

(58) Field of Classification Search
CPC ....... B29C 70/34; B29C 70/12; B29C 70/345; D04H 1/4242; D04H 1/58;
(Continued)

(56) References Cited

U.S. PATENT DOCUMENTS 3,801,273 A * 4/1974 Mays ............... D04H 1/58
                                                                 8/137.5
4,999,240 A * 3/1991 Brotz ............... D04H 1/4242
                                                                 428/401
(Continued)

FOREIGN PATENT DOCUMENTS

CA        2921689    *  9/2017    ............... C08J 5/04
WO   2013076601 A1      5/2013
(Continued)

OTHER PUBLICATIONS

Pimenta, Soraia; Recycling carbon fibre reinforced polymers for structural applications: technology review and market outlook; Waste Management vol. 31, pp. 378-392, ISSN: 0956-053X; 2011.

*Primary Examiner* — Alison L Hindenlang
*Assistant Examiner* — Shibin Liang
(74) *Attorney, Agent, or Firm* — Womble Bond Dickinson (US) LLP

(57) ABSTRACT

A method of manufacturing a composite product includes recovering a wet composite waste from at least one of the manufacturing process or an end-of-life product. The wet composite waste includes a first resin and a plurality of first fibers that are bound together with the first resin. The method also includes grinding the wet composite waste after recovering the wet composite waste. The method also includes mixing the wet composite waste with the second resin into a homogeneous mixture and placing the homogeneous mixture into a cavity. The method includes curing the second resin of the homogeneous mixture such that the homogenous mixture hardens to form a composite product that includes the first resin, the second resin, and the plurality of first fibers.

20 Claims, 22 Drawing Sheets

Related U.S. Application Data which is a continuation of application No. 15/350,976, filed on Nov. 14, 2016, now abandoned.

(60) Provisional application No. 63/551,109, filed on Feb. 8, 2024, provisional application No. 62/255,029, filed on Nov. 13, 2015.

(51) Int. Cl.
  *D04H 1/4242*  (2012.01)
  *D04H 1/58*  (2012.01)
  *B29K 105/08*  (2006.01)
  *B29K 105/12*  (2006.01)
  *B29K 279/00*  (2006.01)
  *B29K 309/00*  (2006.01)

(52) U.S. Cl.
  CPC .. *B29K 2105/0854* (2013.01); *B29K 2105/12* (2013.01); *B29K 2279/00* (2013.01); *B29K 2309/00* (2013.01); *B29K 2313/00* (2013.01)

(58) Field of Classification Search
  CPC ........ B29K 2105/0854; B29K 2105/12; B29K 2279/00; B29K 2309/00; B29K 2313/00; B32B 37/02
  See application file for complete search history.

(56) References Cited

U.S. PATENT DOCUMENTS

| | | | |
|---|---|---|---|
| 5,215,695 A | 6/1993 | Bortoluzzi et al. | |
| 5,288,760 A | 2/1994 | Morgan | |
| 5,342,418 A * | 8/1994 | Jesse | C10L 5/40 44/589 |
| 5,569,424 A | 10/1996 | Amour | |
| 5,589,260 A | 12/1996 | Ben Zvi et al. | |
| 5,665,295 A | 9/1997 | Takamoto et al. | |
| 5,728,847 A | 3/1998 | Ohara et al. | |
| 5,879,601 A | 3/1999 | Baker | |
| 5,958,164 A | 9/1999 | Ishiwatari et al. | |
| 6,153,291 A | 11/2000 | Strasser | |
| 6,361,722 B1 | 3/2002 | Theys et al. | |
| 6,986,854 B2 | 1/2006 | Sumi et al. | |
| 7,147,734 B2 | 12/2006 | Ogle et al. | |
| 7,459,493 B2 | 12/2008 | Singer | |
| 7,527,865 B2 | 5/2009 | Kessing | |
| 7,811,489 B2 | 10/2010 | Pervan et al. | |
| 8,431,054 B2 | 4/2013 | Pervan et al. | |
| 8,474,736 B2 | 7/2013 | Lehtinen et al. | |
| 8,518,312 B2 | 8/2013 | Katz | |
| 9,028,731 B2 | 5/2015 | Weyant et al. | |
| 9,427,897 B2 | 8/2016 | Versolato et al. | |
| 9,856,358 B2 | 1/2018 | Witte | |
| 10,513,094 B2 | 12/2019 | Persson et al. | |
| 10,603,821 B2 | 3/2020 | Fisher, Jr. et al. | |
| 10,661,482 B2 | 5/2020 | Desbois et al. | |
| 10,913,176 B2 | 2/2021 | Lindgren et al. | |
| 12,030,263 B2 | 7/2024 | Holmes, IV | |
| 2001/0018118 A1* | 8/2001 | Muzzy | B29B 17/0042 524/582 |
| 2004/0173239 A1 | 9/2004 | Grove-Nielsen | |
| 2008/0169380 A1 | 7/2008 | Jackson et al. | |
| 2008/0241296 A1 | 10/2008 | Wang et al. | |
| 2009/0047502 A1* | 2/2009 | Folaron | B32B 5/26 977/773 |
| 2011/0301287 A1* | 12/2011 | Weyant | B29B 17/0042 264/109 |
| 2012/0077402 A1 | 3/2012 | Grasser et al. | |
| 2013/0192434 A1 | 8/2013 | Hashimoto et al. | |
| 2014/0212624 A1 | 7/2014 | Ayuzawa | |
| 2014/0262088 A1 | 9/2014 | Deka | |
| 2020/0094443 A1 | 3/2020 | Schäfer et al. | |

FOREIGN PATENT DOCUMENTS

| | | |
|---|---|---|
| WO | 2020028914 A1 | 2/2020 |
| WO | 2020222221 A1 | 11/2020 |

\* cited by examiner

306A

306B

COMPOSITE PRODUCTS AND RELATED METHODS FOR MANUFACTURING COMPOSITE PRODUCTS FROM RECYCLED COMPOSITE MATERIALS

CROSS-REFERENCE TO RELATED APPLICATIONS

This application claims the benefit of, and priority to, U.S. Provisional Patent Application Ser. No. 63/551,109, filed Feb. 8, 2024. This application is also a continuation-in-part of U.S. patent application Ser. No. 17/104,065, filed Nov. 25, 2020, which is a continuation of U.S. patent application Ser. No. 15/350,976, filed Nov. 14, 2016, now abandoned, which claims the benefit of U.S. Provisional Patent Application Ser. No. 62/255,029, filed Nov. 13, 2015. The entire contents of each of the above applications are hereby incorporated by reference.

FIELD OF THE DISCLOSURE

The present disclosure relates to composite products, and more particularly to composite products comprising recycled composite materials.

BACKGROUND

The production of composite products results in a large quantity of material waste. In addition, at the end-of-life of a composite product, the composite product is considered waste. As such, there is tremendous amount of composite materials that end up in landfills.

BRIEF SUMMARY OF THE DISCLOSURE

The present disclosure relates to composite products that are formed from recycled composite materials. The composite products may include wet waste, dry waste, and resin to form the finished composite product. The composite products include, but are not limited to, vehicle (e.g., truck) and trailer components such as floors, walls, ceilings, and components of recreational vehicles; walls, floors, doors, and ceilings of shipping containers; countertops; tiles for flooring or walls; building panels; storm barrier panels; and as a plywood replacement such as roofing underlayment, subfloors, and cladding.

In one aspect a composite is provided. The composite may include a resin. Further, the composite may include a plurality of oxidized polyacrylonitrile fibers. The oxidized polyacrylonitrile fibers may be provided as a nonwoven fabric.

In some embodiments the oxidized polyacrylonitrile fibers may be provided as a wet-lay nonwoven fabric. The plurality of oxidized polyacrylonitrile fibers may define an outer layer.

In an additional aspect, a method for forming a composite is provided. The method may include forming a plurality of oxidized polyacrylonitrile fibers into a nonwoven fabric. Further, the method may include positioning the nonwoven fabric and a resin in a mold. The method may additionally include curing the resin in the mold.

In some embodiments forming the oxidized polyacrylonitrile fibers into the nonwoven fabric may include forming the oxidized polyacrylonitrile fibers in a wet-lay nonwoven fabric. Further, positioning the nonwoven fabric and the resin in the mold may include positioning the wet-lay nonwoven fabric and the resin in the mold. Positioning the nonwoven fabric in the mold may include forming an outer layer with the nonwoven fabric.

In an additional aspect, a composite is provided. The composite may include a resin. The composite may further include a plurality of material scraps respectively comprising a plurality of carbon fibers. The material scraps may be positioned to at least partially overlap one another and define a substantially continuous layer. The material scraps may respectively include the carbon fibers may be provided as a fabric and/or a plurality of loose fibers.

In some embodiments the composite may further include a plurality of pre-impregnated carbon fiber chips defining a second substantially continuous layer. The second substantially continuous layer may be an outer layer. The composite may define a shipping container panel, a countertop, or a storm barrier panel. The composite may further include at least one of an aramid layer, a meta-aramid layer, or a fiberglass layer. Each of the carbon fibers may define a length greater than about one inch. The material scraps respectively including the carbon fibers may be provided as the fabric and as the loose fibers.

In an additional aspect, a method for forming a composite is provided. The method may include providing a resin. Further, the method may include providing a plurality of material scraps respectively including a plurality of carbon fibers. The material scraps may be provided as a fabric and/or a plurality of loose fibers. The method may further include positioning the material scraps in a mold such that the material scraps at least partially overlap one another and define a substantially continuous layer. Additionally, the method may include adding the resin to the material scraps. Further, the method may include hardening the resin in the mold.

In some embodiments the method may further include providing a plurality of pre-impregnated carbon fiber chips, positioning the pre-impregnated carbon fiber chips in the mold such that the pre-impregnated carbon fiber chips at least partially overlap one another and define a second substantially continuous layer, and adding the resin to the pre-impregnated carbon fiber chips. Positioning the pre-impregnated carbon fiber chips in the mold may include positioning the pre-impregnated carbon fiber chips such that the second substantially continuous layer is an outer layer. The method may further include positioning at least one of an aramid material and a fiberglass material in the mold to define a strengthening layer and adding the resin to the strengthening layer.

In some embodiments, providing the material scraps may include retaining the material scraps in an initial size and shape associated with formation of the material scraps. Hardening the resin in the mold may include forming a shipping container panel, a countertop, or a storm barrier panel. Providing the material scraps may include providing the fabric and the loose fibers.

In embodiments of the present disclosure, a method of manufacturing a composite product includes recovering a wet composite waste from at least one of a manufacturing process or an end-of-life product. The wet composite waste includes a first resin and a plurality of first fibers that are bound together with the first resin. The method also includes grinding the wet composite waste after recovering the wet composite waste. The method also includes mixing the wet composite waste with the second resin into a homogeneous mixture and placing the homogeneous mixture into a cavity. The method includes curing the second resin of the homogeneous mixture such that the homogenous mixture hardens to form a composite product that includes the first resin, the second resin, and the plurality of first fibers.

In embodiments, mixing the wet composite waste with the second resin includes adding dry composite waste such that the homogeneous mixture includes the wet composite waste, the dry composite waste, and the second resin. The method may further include placing a base layer into the cavity before placing the homogeneous mixture into the cavity. The base layer may be formed of a plurality of fibers in fiber or fabric form. The main method may also include recovering dry composite waste and placing the base layer may include placing the recovered dry composite waste into the cavity. The method may include placing a top layer into the cavity over the homogeneous mixture after placing the homogeneous mixture into the cavity and before curing the second resin.

In some embodiments, the method may include applying pressure to the homogeneous mixture in the cavity before or during curing of the second resin. Applying pressure to the homogeneous mixture may be completed on a two-belt press or on a static press. Applying pressure to the homogeneous mixture may include the pressure being in a range of 5 pounds per square inch to 1000 pounds per square inch.

In certain embodiments, grinding the wet composite waste includes grinding the plurality of first fibers bound together with the first resin and other materials incorporated with the wet composite waste. The other materials incorporated with the wet composite waste include at least one of foam, wood, metal, or paint. Grinding the wet composite waste may include grinding the wet composite waste to a desired size in a range of 0.125 inches to 1 inch. Recovering the wet composite waste may include the first resin being cured prior to recovering the wet composite waste. Mixing the wet composite waste may include the plurality of first fibers being at least one of carbon fibers, glass fibers, glass microspheres, Kevlar® fibers, aramid fibers, meta-aramid fibers, or basalt fibers.

In particular embodiments, during the second resin to form a composite product includes the composite product being a truck floor, a trailer floor, a shipping container floor, a truck wall, a trailer wall, a shipping container wall, a truck ceiling, a trailer ceiling, a shipping container ceiling, a building panel, a countertop, tile for flooring or walls, a storm barrier panel, a roofing underlayment, a subfloor, cladding, or a plywood replacement.

In another embodiment of the present disclosure, a method of manufacturing a floor for trailers or shipping containers includes grinding a wet composite waste that includes a first resin and a plurality of first fibers that are bound together with the first resin. The method also includes mixing the wet composite waste with the second resin into a homogeneous mixture and placing the homogeneous mixture into a cavity. The method also includes curing the second resin of the homogeneous mixture such that the homogeneous mixture hardens to form a floor for a trailer or shipping container that includes the first resin, the second resin, and the plurality of first fibers.

In embodiments, mixing the wet composite waste includes the plurality of first fibers being at least one of carbon fibers, glass fibers, glass microspheres, Kevlar® fibers, aramid fibers, meta-aramid fibers, or basalt fibers.

In another embodiment of the present disclosure, a composite product includes discrete pieces of particulated composite material and a second resin. The discrete pieces of particulated composite materials are formed of a plurality of fibers that are bound together with the first resin. The second resin surrounds and bonds each discrete piece of particulated composite material into a unitary composite product.

The composite products further includes a plurality of inclusions. Each inclusion may be surrounded by the second resin such that the second resin binds each inclusion and each discrete piece of particulated composite material into the unitary composite product. Each inclusion may be at least one of foam, wood, metal, or paint. The unitary composite product may be a truck floor, a trailer floor, a shipping container floor, a truck wall, trailer wall, a shipping container wall, a truck ceiling, a trailer ceiling, a shipping container ceiling, the building panel, a countertop, a tile for flooring or walls, a storm barrier panel, a roofing underlayment, a subfloor, cladding, or plywood replacement.

Further, to the extent consistent, any of the embodiments or aspects described herein may be used in conjunction with any or all of the other embodiments or aspects described herein.

BRIEF DESCRIPTION OF THE FIGURES

Figure 1:
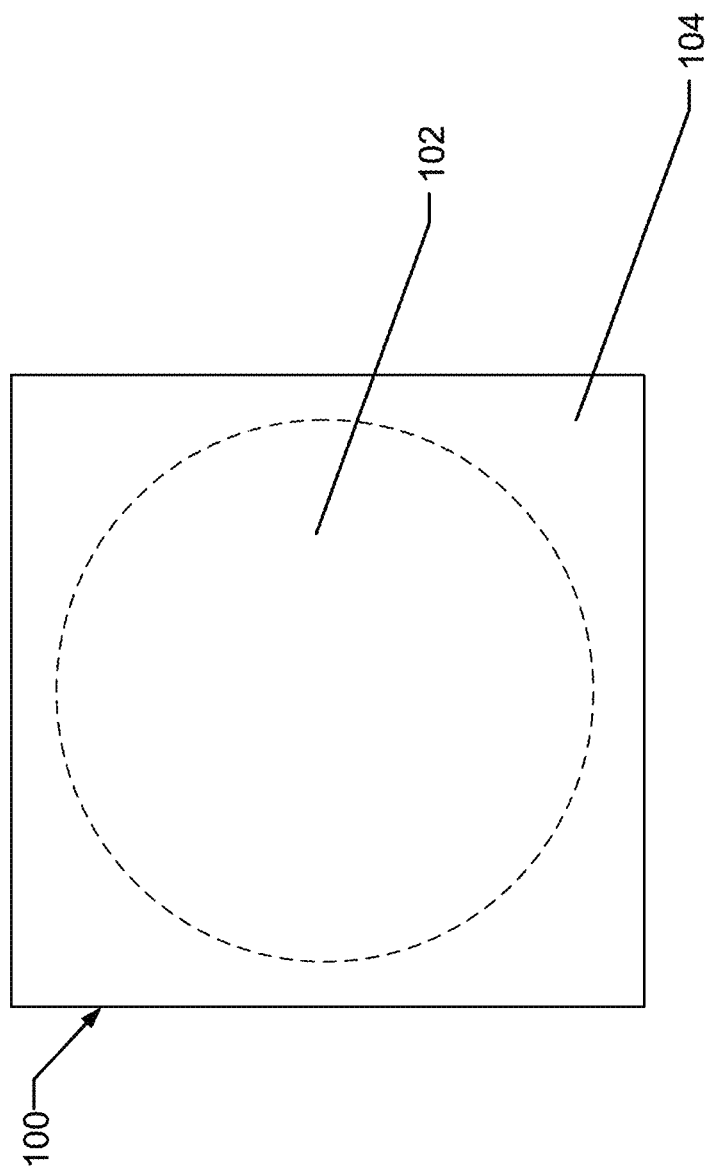
Figure 2:
Figure 3:
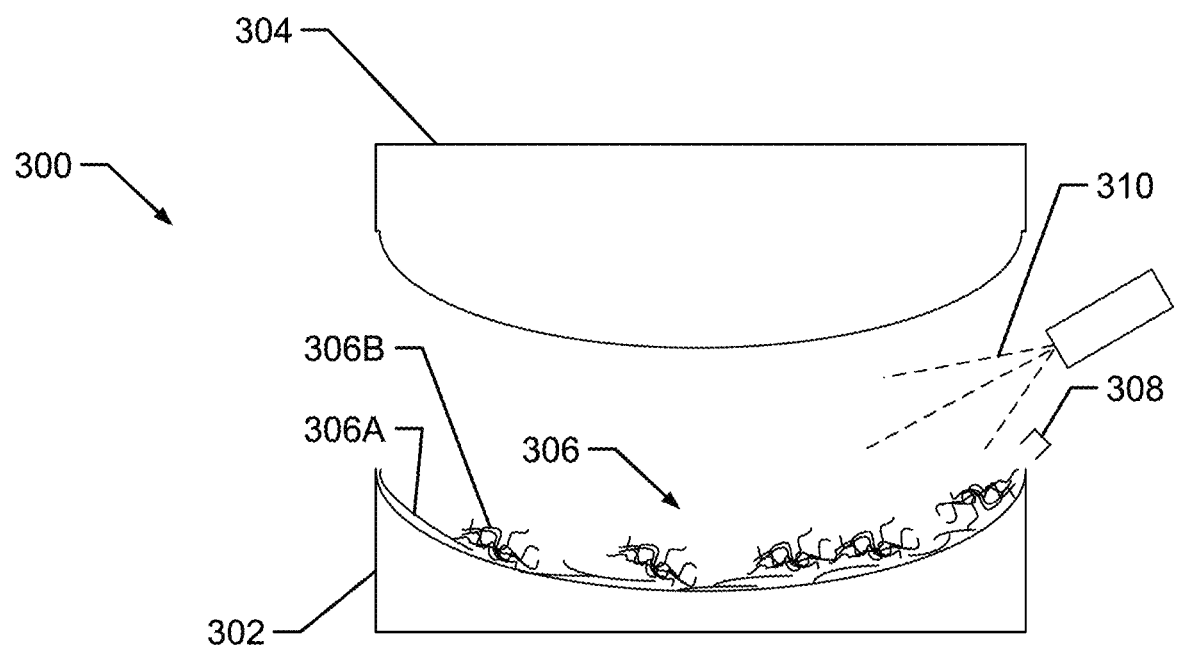
Figure 4:
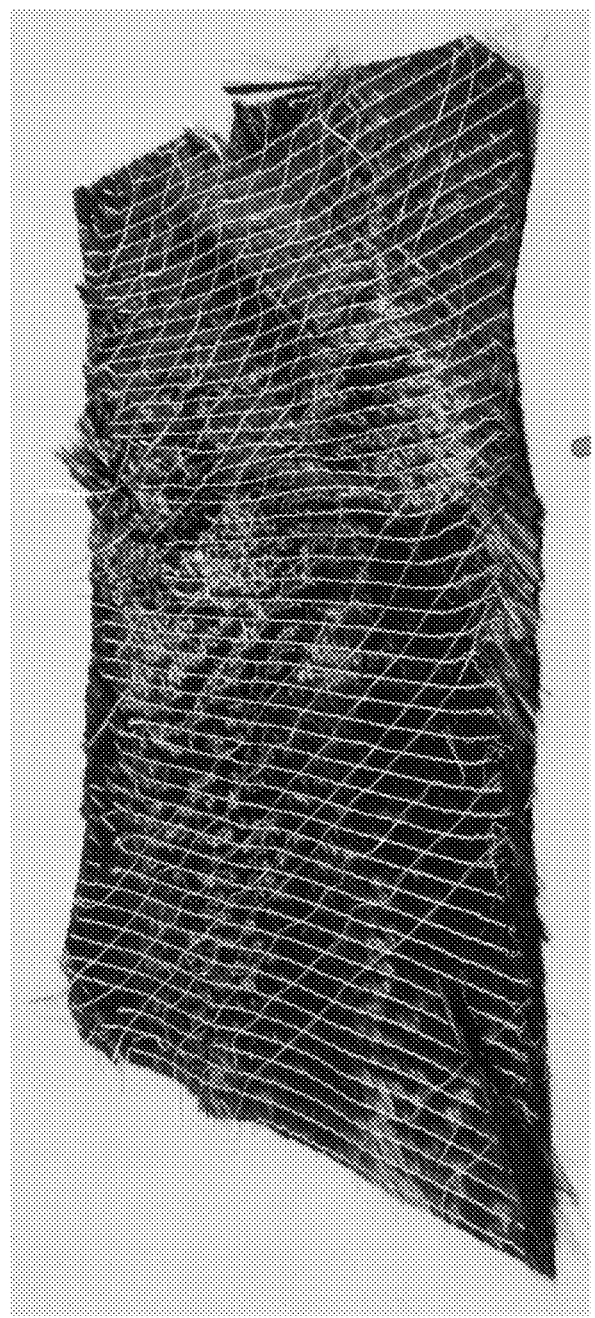
Figure 5:
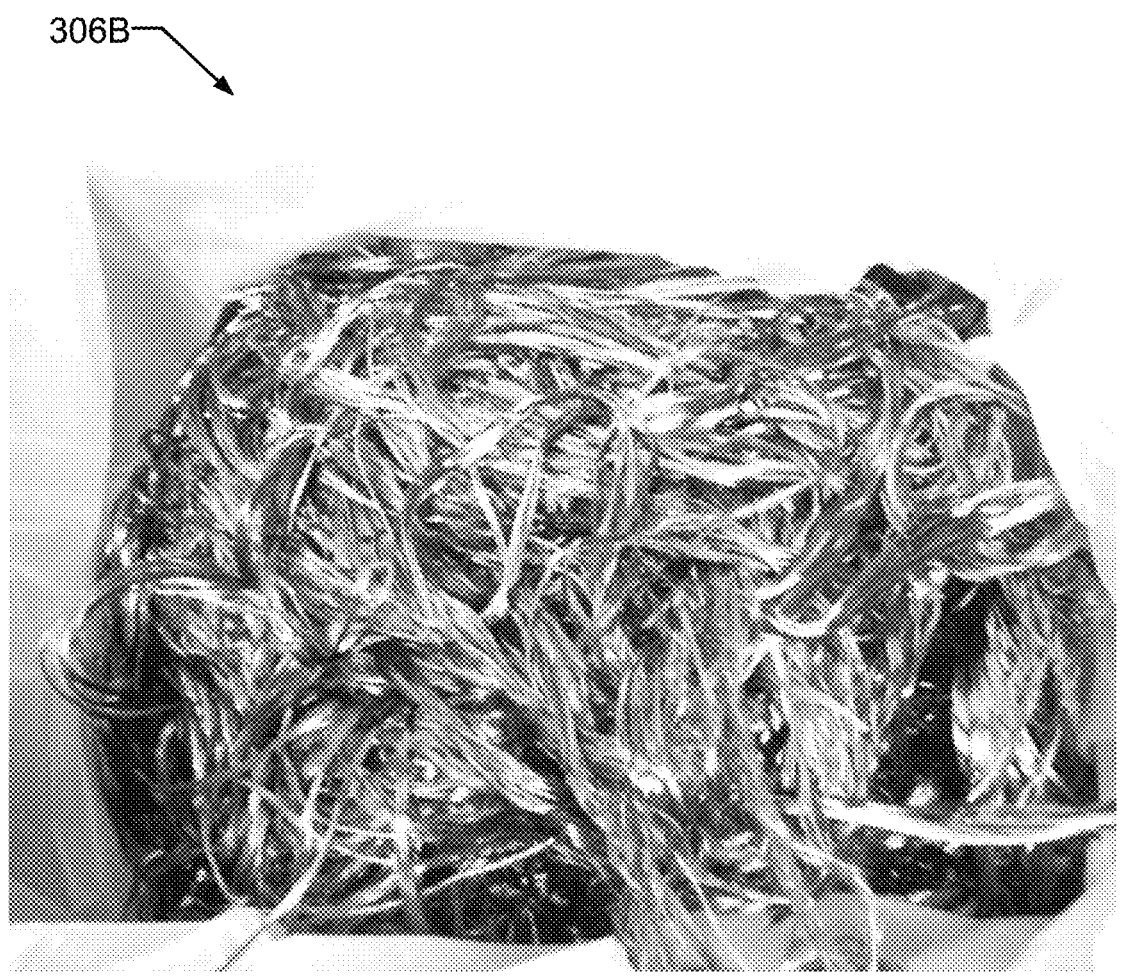
Figure 6:
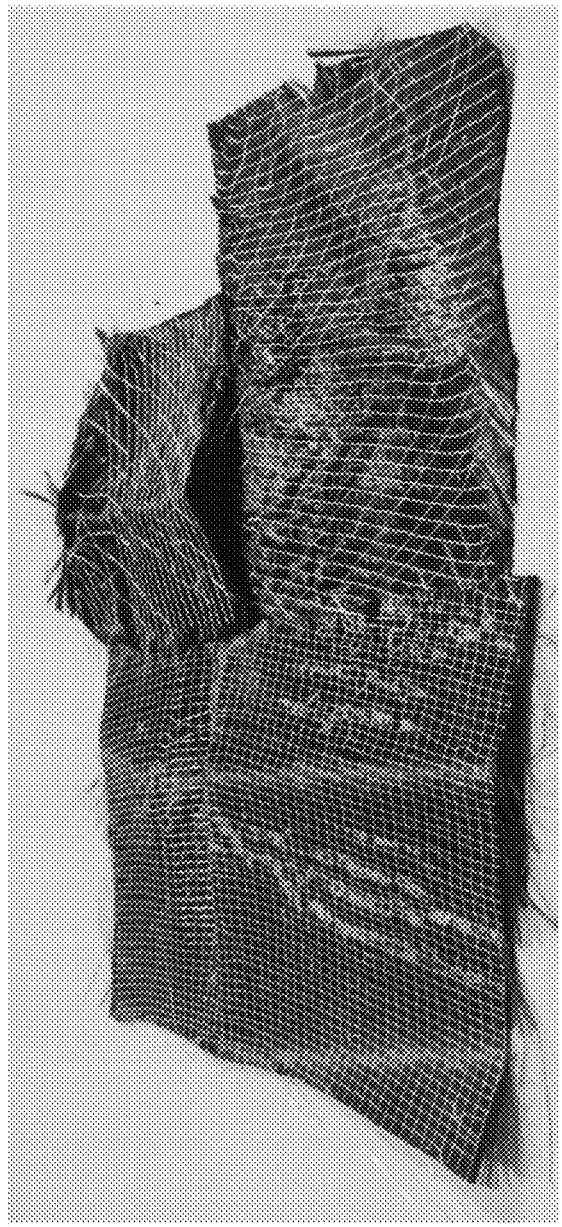
Figure 7:
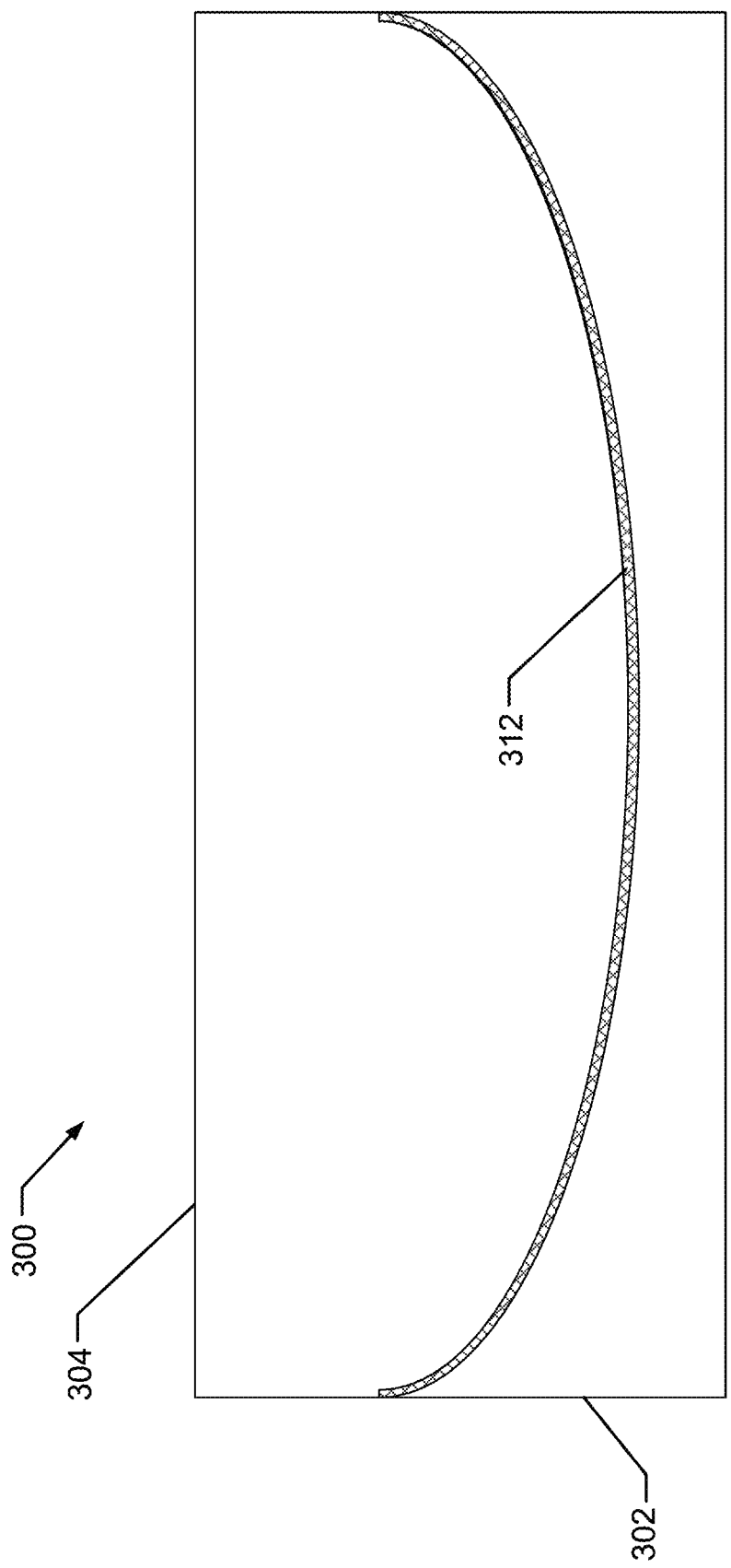
Figure 8:
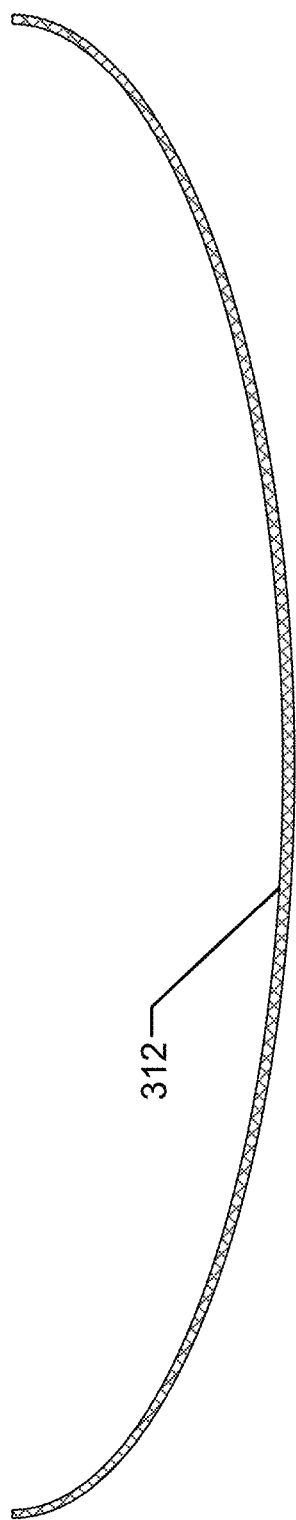
Figure 9:
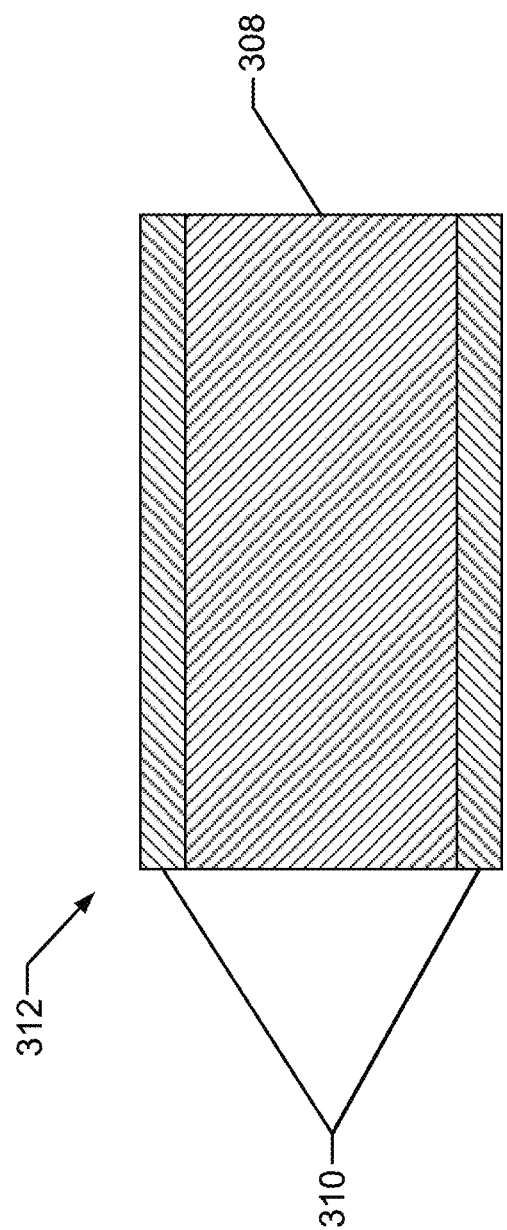
Figure 10:
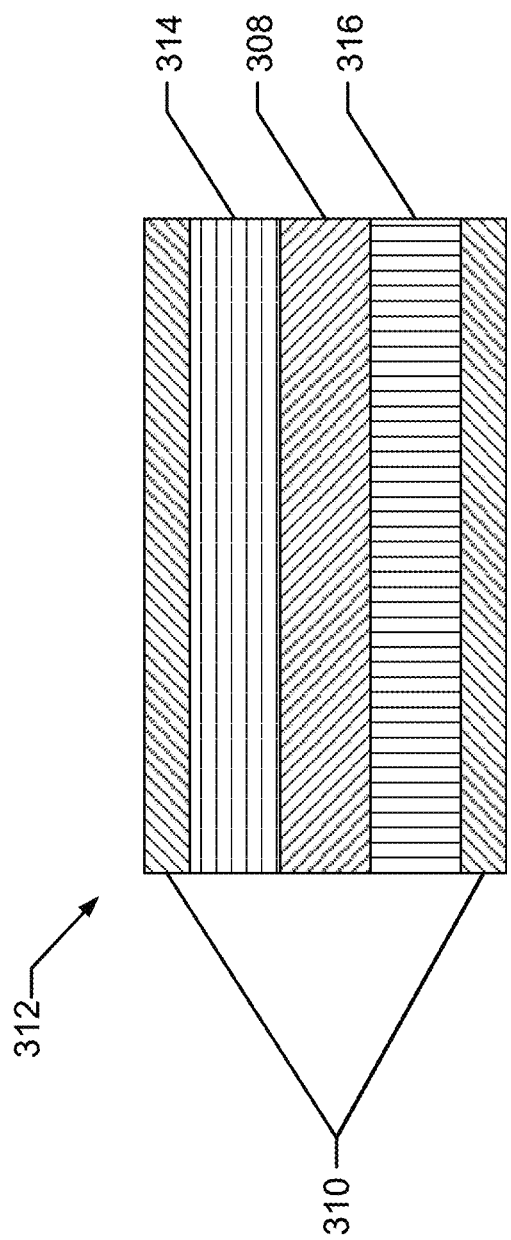
Figure 11:
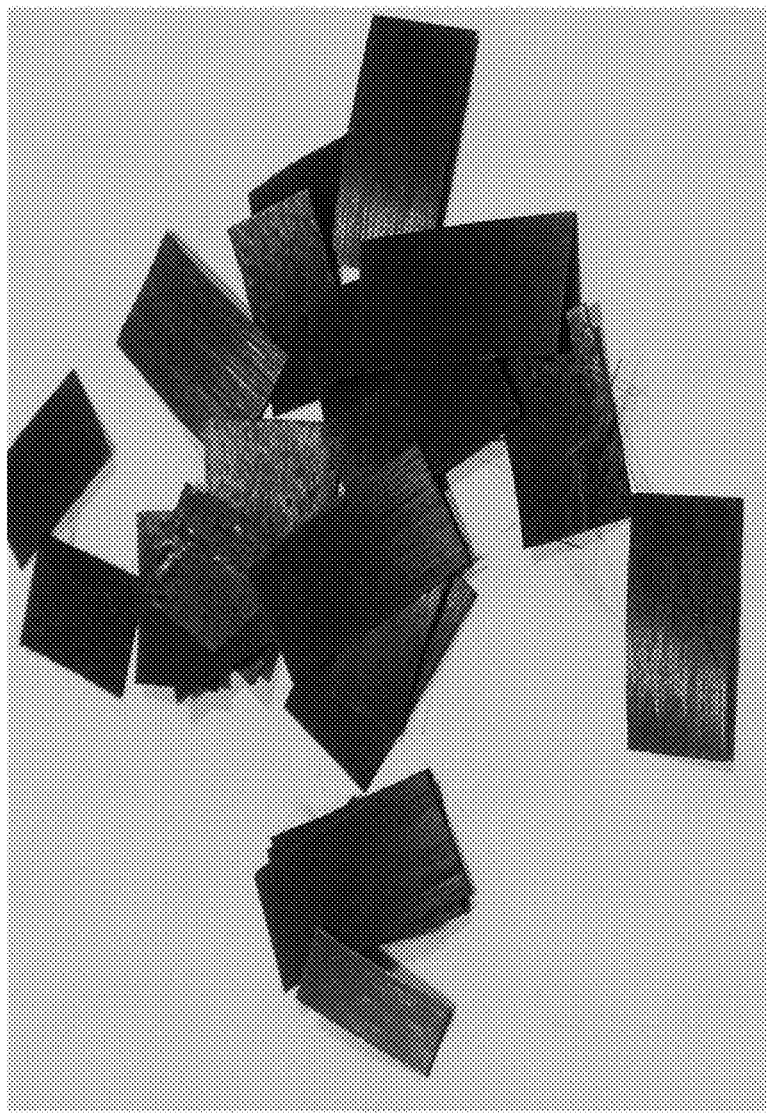
Figure 12:
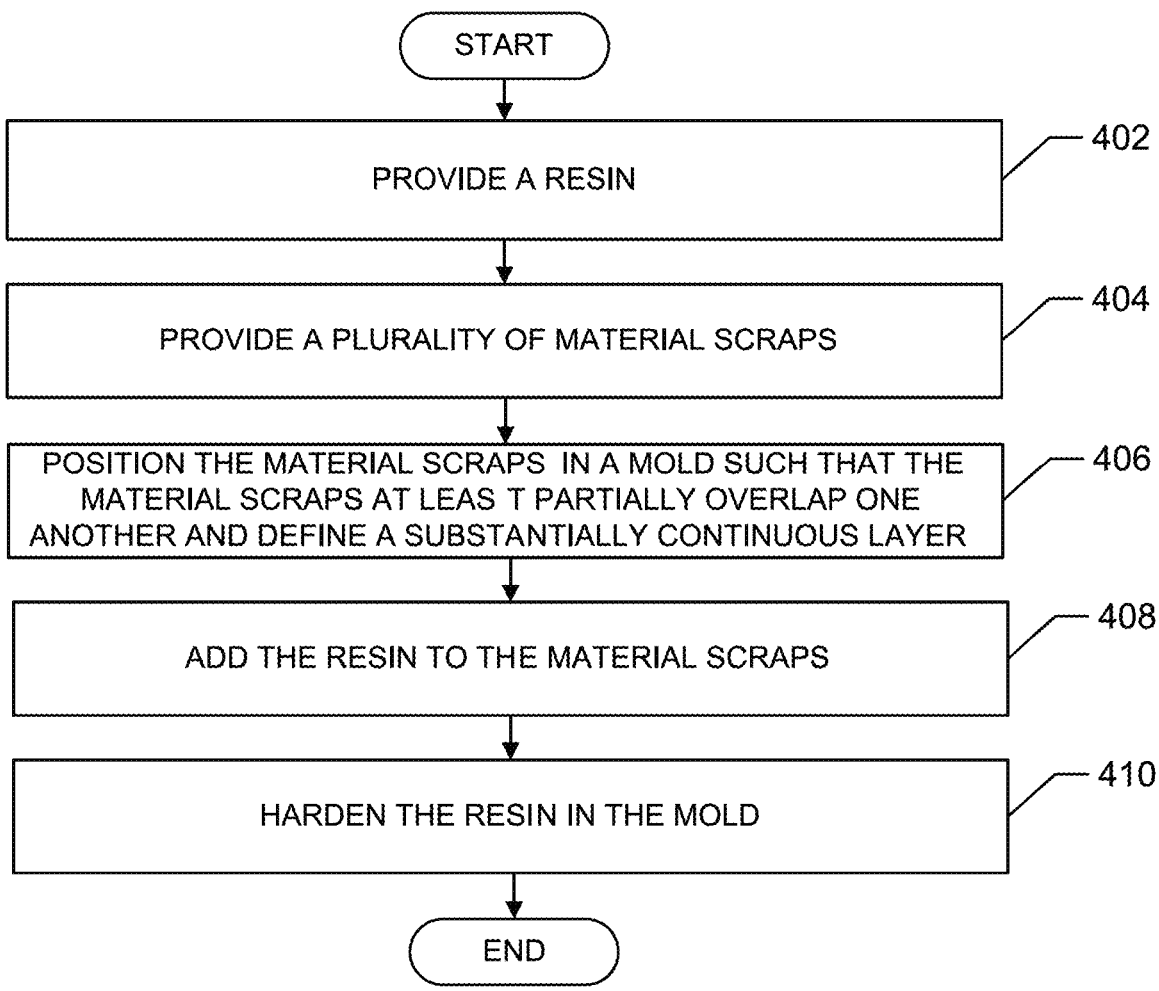
Figure 13:
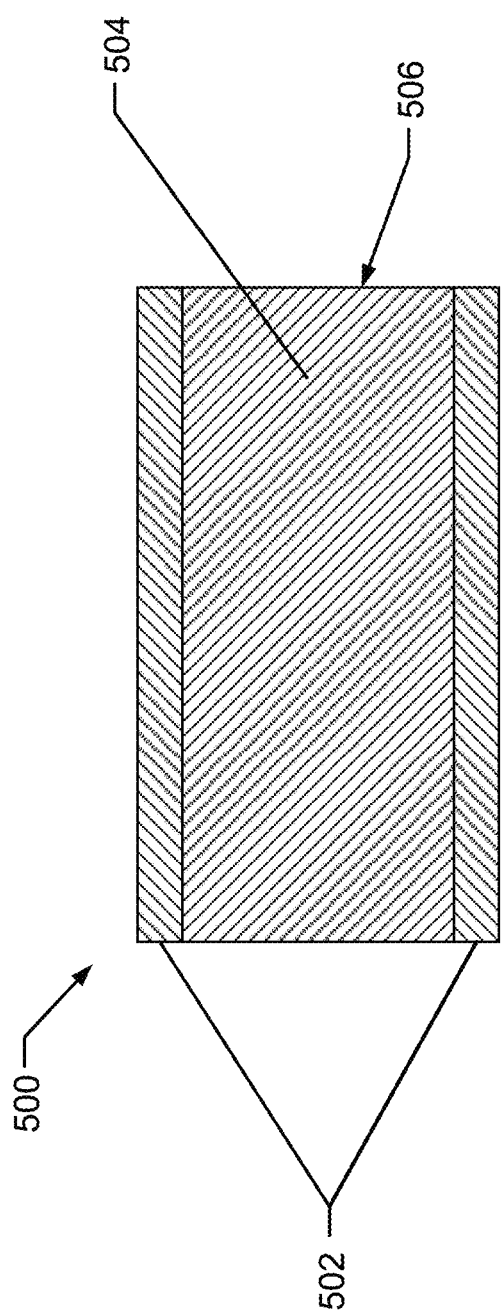
Figure 14:
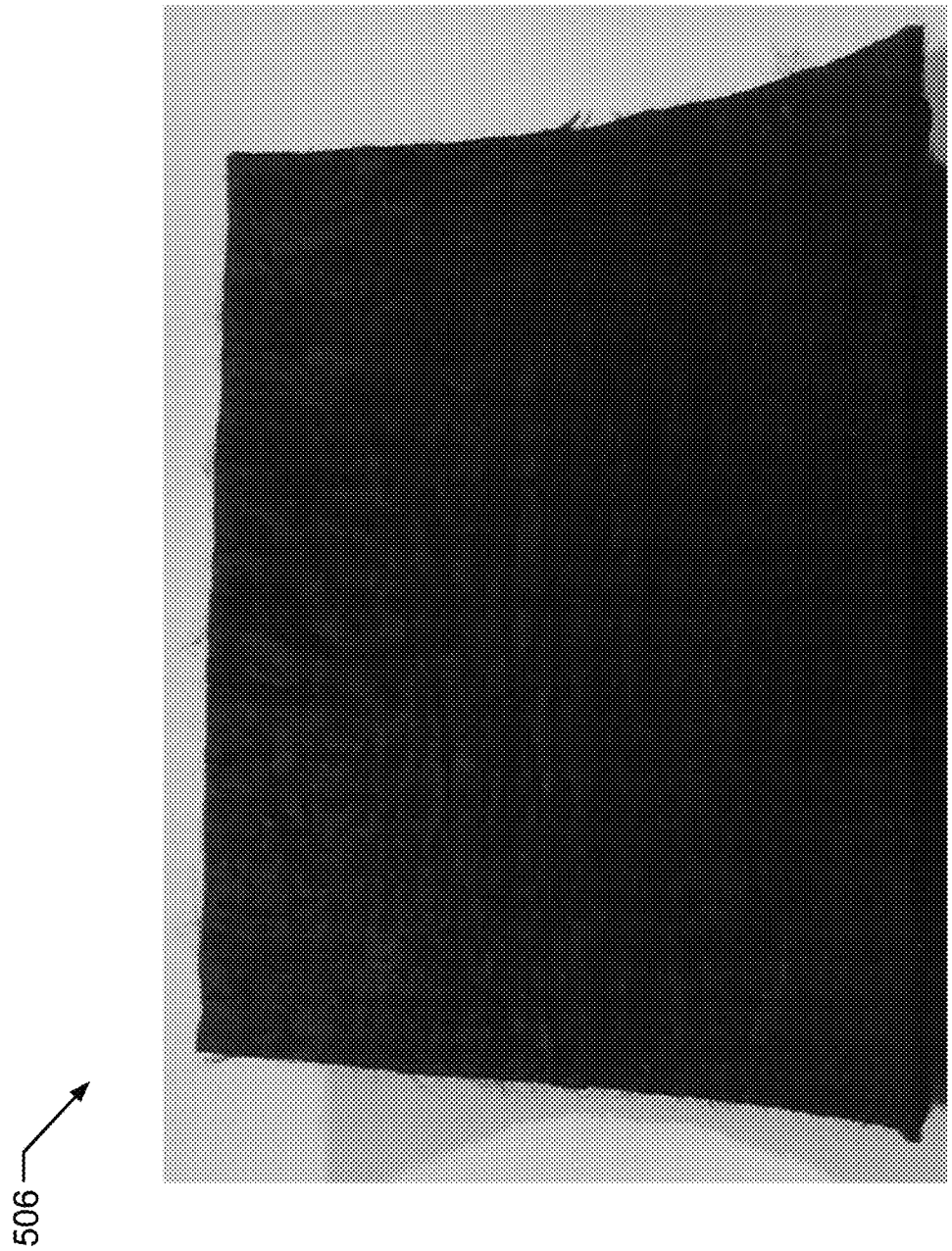
Figure 15:
Figure 16:
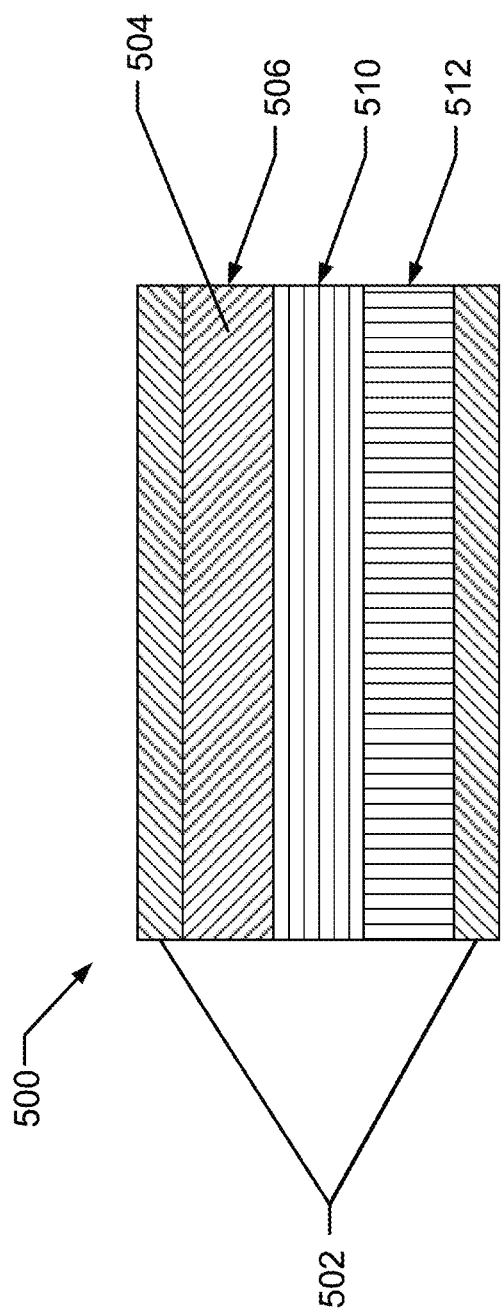
Figure 17:
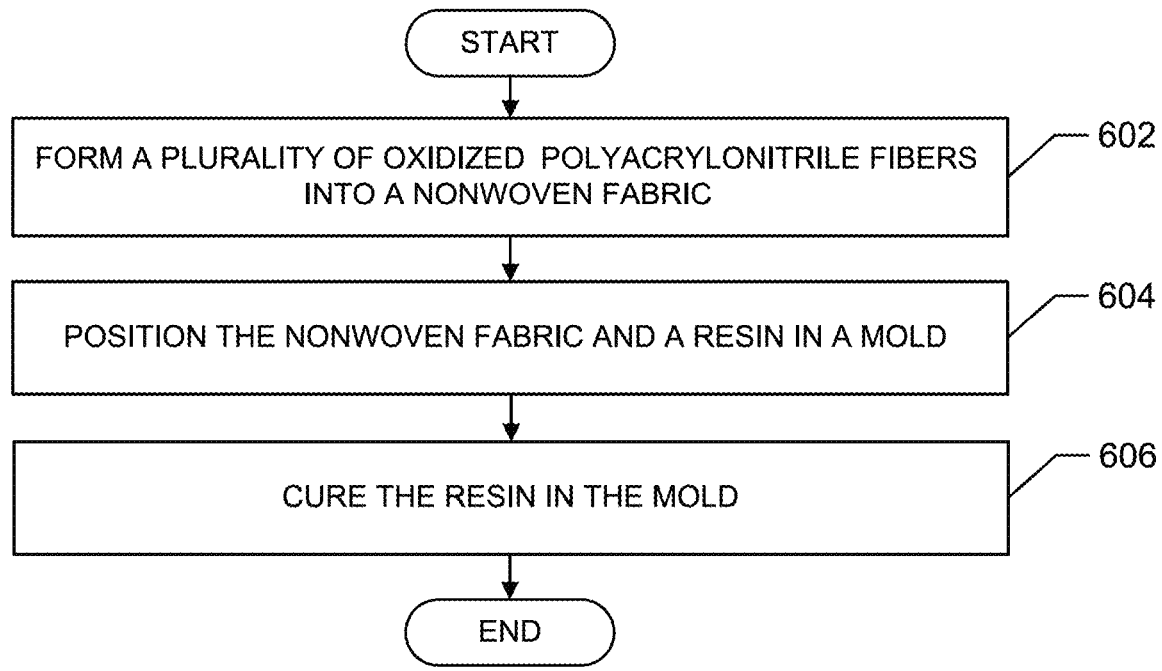
Figure 18:
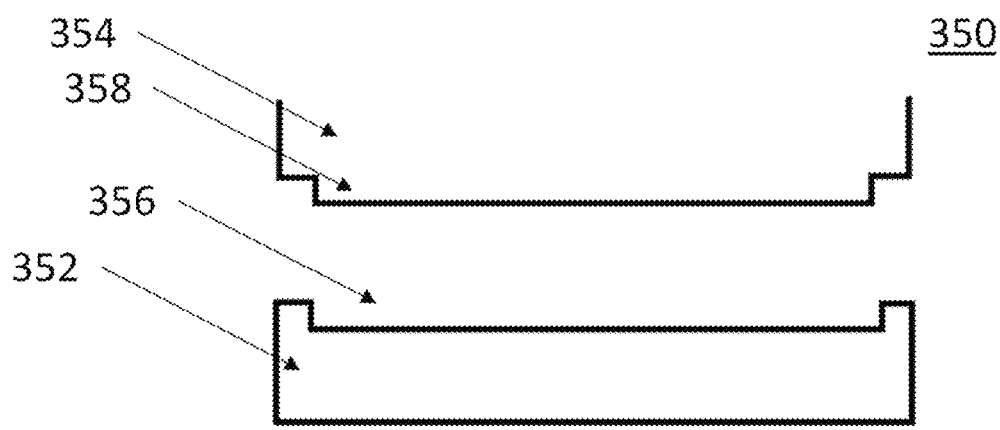
Figure 19:
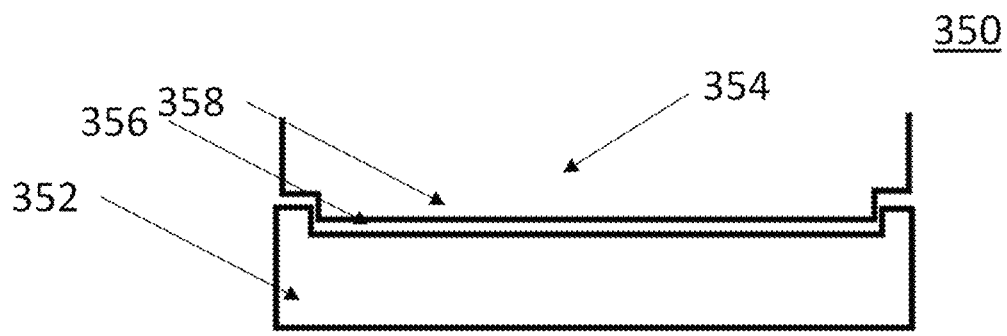
Figure 20:
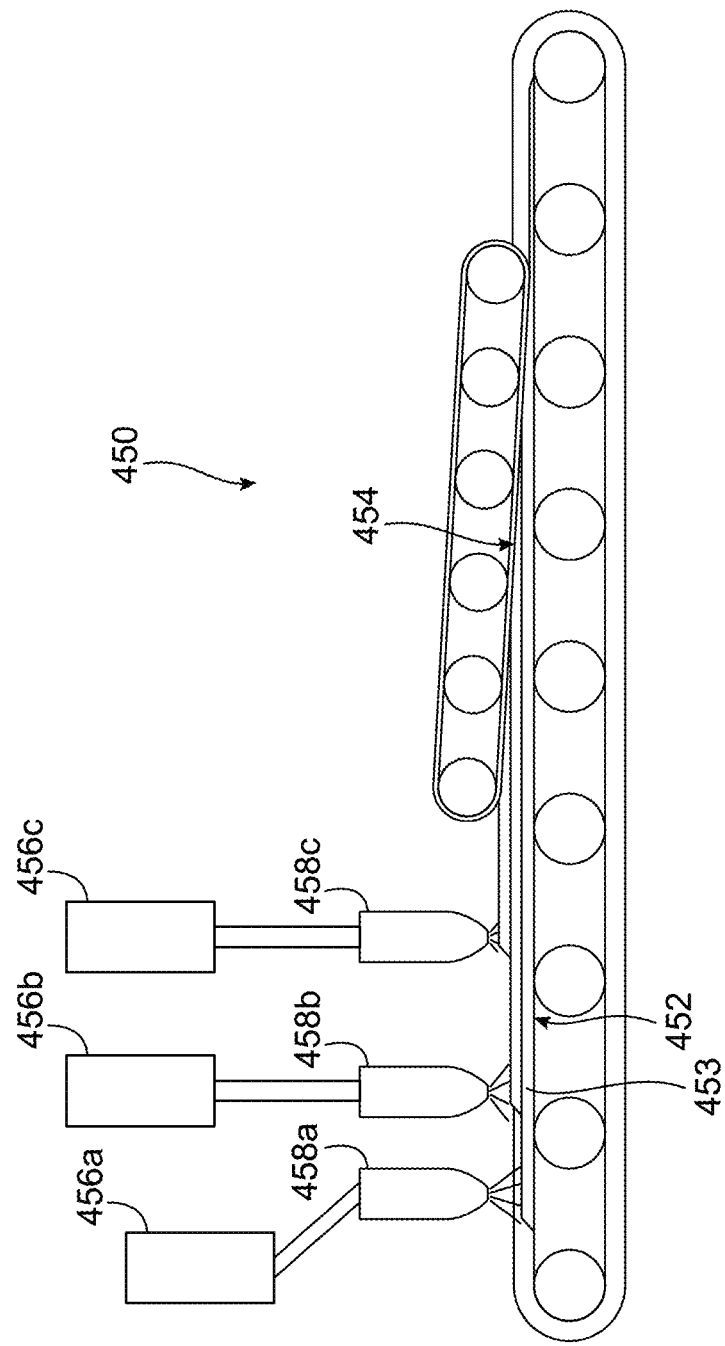
Figure 21:
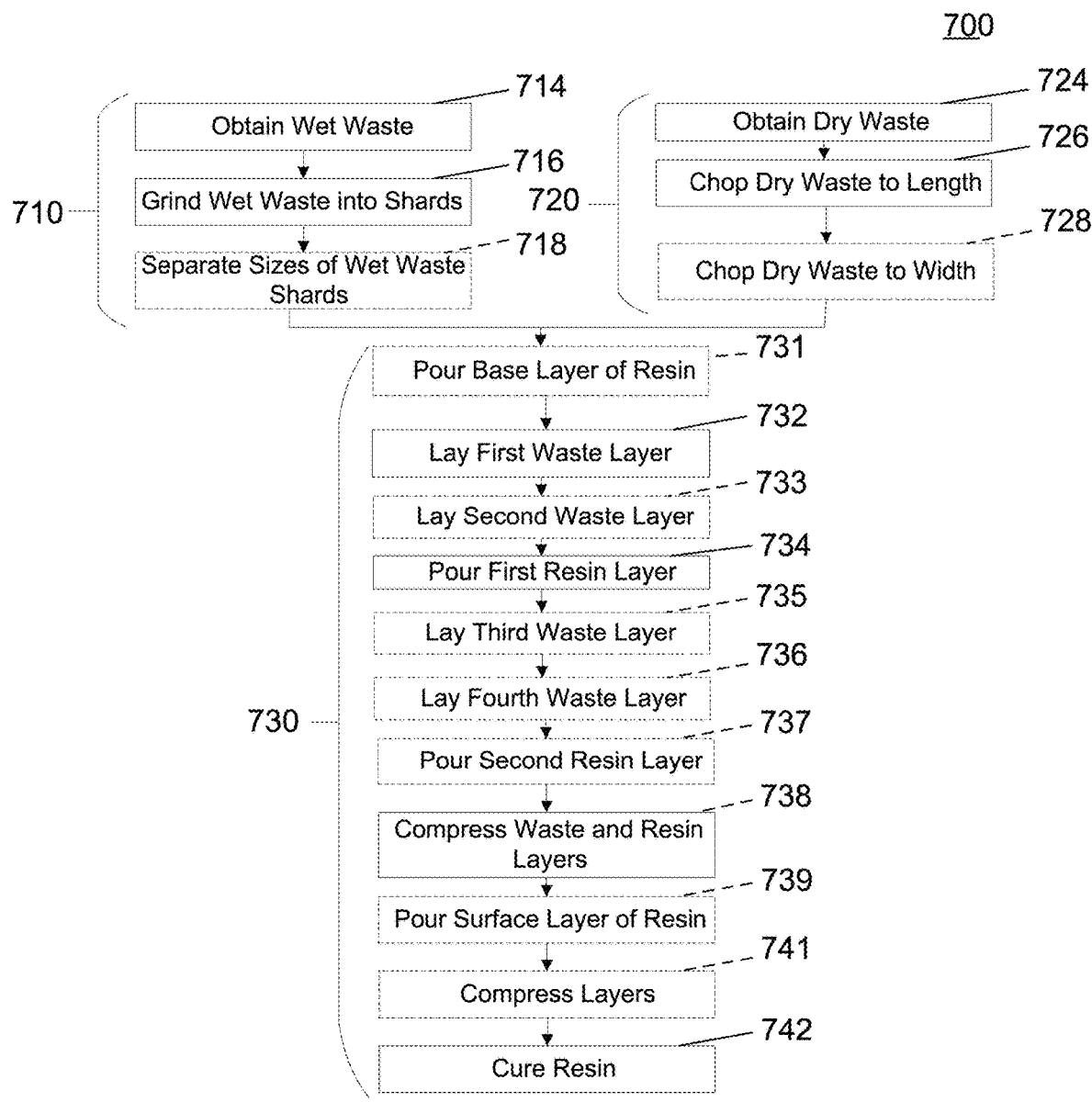
Figure 22:
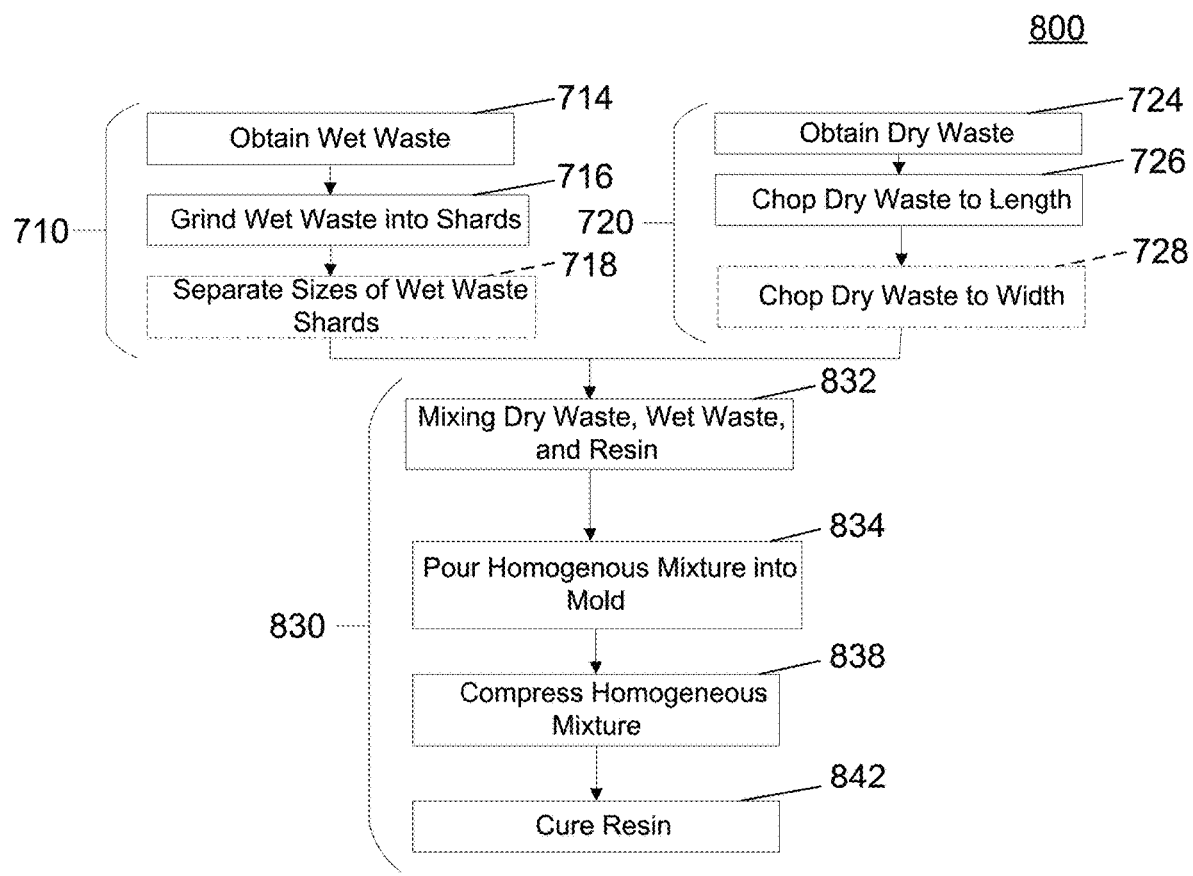
Figure 23:
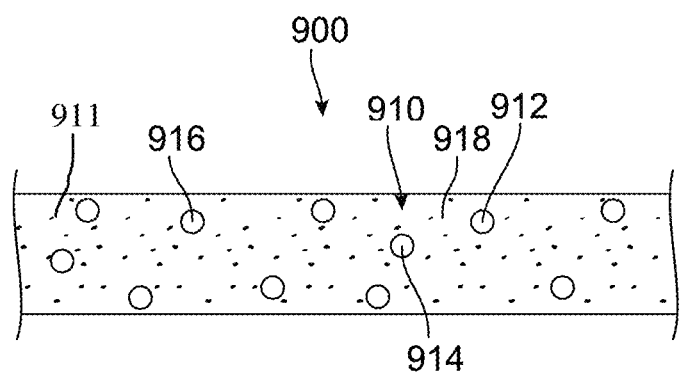
Figure 24:
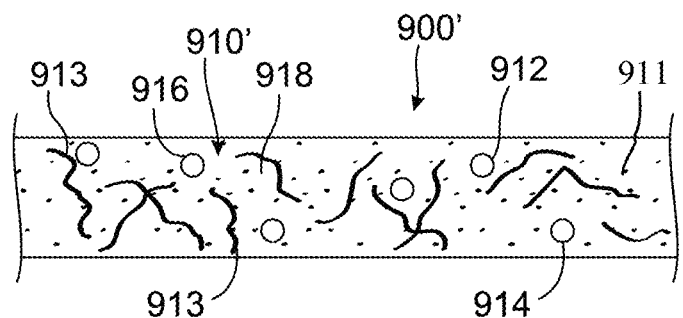
Figure 25:
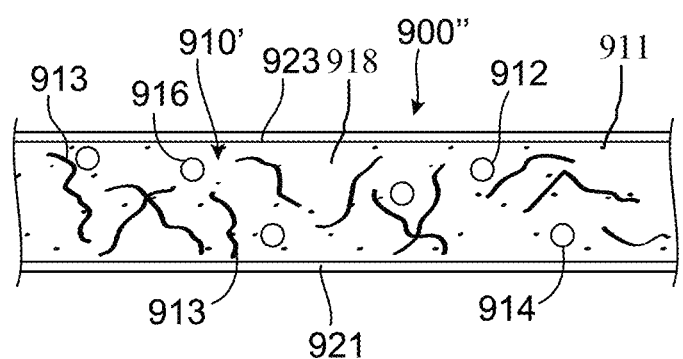

Having thus described the disclosure in general terms, reference will now be made to the accompanying drawings, which are not necessarily drawn to scale, and wherein:

FIG. 1 schematically illustrates cutting a piece of material from a sheet of fabric according to an example embodiment of the present disclosure;

FIG. 2 illustrates a perspective view of a piece of non-woven fabric according to an example embodiment of the present disclosure;

FIG. 3 schematically illustrates a mold in an open configuration according to an example embodiment of the present disclosure;

FIG. 4 illustrates a perspective view of a piece of woven fabric according to an example embodiment of the present disclosure;

FIG. 5 illustrates a perspective view of loose fibers according to an example embodiment of the present disclosure;

FIG. 6 illustrates overlapping material scraps comprising woven fabric according to an example embodiment of the present disclosure;

FIG. 7 illustrates the mold of FIG. 3 in a closed configuration according to an example embodiment of the present disclosure;

FIG. 8 illustrates a composite product produced in the mold of FIG. 3 according to an example embodiment of the present disclosure;

FIG. 9 schematically illustrates a sectional view through the composite of FIG. 8 according to an example embodiment of the present disclosure wherein the composite includes resin and a substantially continuous layer comprising scrap materials;

FIG. 10 schematically illustrates a sectional view through the composite of FIG. 8 according to an example embodiment of the present disclosure wherein the composite includes resin, a substantially continuous layer comprising scrap materials, and a plurality of additional layers;

FIG. 11 illustrates a perspective view of a plurality of pre-impregnated carbon fiber chips according to an example embodiment of the present disclosure;

FIG. 12 schematically illustrates a method for forming a composite comprising material scraps according to an example embodiment of the present disclosure;

FIG. 13 schematically illustrates a sectional view through a composite product according to an example embodiment of the present disclosure wherein the composite product includes resin and a plurality of fibers;

FIG. 14 illustrates a perspective view of wet-lay nonwoven fabric comprising fibers according to an example embodiment of the present disclosure;

FIG. 15 illustrates a perspective view of needle-punch nonwoven fabric comprising fibers according to an example embodiment of the present disclosure;

FIG. 16 schematically illustrates a sectional view through the composite of FIG. 13 according to an example embodiment of the present disclosure wherein the composite further includes one or more additional layers;

FIG. 17 schematically illustrates a method for forming a composite comprising resin and nonwoven fabric comprising fibers according to an example embodiment of the present disclosure;

FIG. 18 is a schematic view of an apparatus for forming a composite product provided in accordance with an embodiment of the present disclosure with a mold and a die of the apparatus in an open position relative to one another;

FIG. 19 is a schematic view of the apparatus of FIG. 18 with the mold and the die in a compressed position relative to one another;

FIG. 20 is a schematic view of an apparatus for forming a composite product provided in accordance with an embodiment of the present disclosure illustrating a two-belt press;

FIG. 21 is a flow chart of a method of manufacturing a composite product provided in accordance with an embodiment of the present disclosure;

FIG. 22 is a flow chart of another method of manufacturing a composite product provided in accordance with an embodiment of the present disclosure;

FIG. 23 is a schematic cross-sectional view of a composite product provided in accordance with the present disclosure;

FIG. 24 is a schematic cross-sectional view of another composite product provided in accordance with the present disclosure; and FIG. 25 is a schematic cross-sectional view of another composite product provided in accordance with the present disclosure.

DETAILED DESCRIPTION

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships, or the like, unless otherwise stated, any one or more if not all of these may be absolute or approximate to account for acceptable variations that may occur, such as those due to manufacturing or engineering tolerances or the like.

As used herein, the term "composite materials" includes materials that are components to be added to a composite product including, but not limited to, oxidized polyacrylonitrile fibers, carbon fibers, glass fibers, glass microspheres, Kevlar® fibers, aramid fibers, meta-aramid fibers, basalt fibers, and combinations thereof. A prepreg including the previously listed composite materials may also be considered a composite material. The composite materials may be in the form of wet waste or dry waste. As used herein, the term "wet waste" refers to any of the composite materials above that has been exposed to and includes resin. The resin of wet waste may be cured or uncured. Wet waste may be waste from manufacturing and/or may be from a composite product that has reached the end of its life. As used herein, the term "dry waste" refers to composite material that has not been exposed to resin. Dry waste may include carbage, selvage, or other waste fibers. Dry waste may be in fabric or fiber form. When in fabric form, dry waste may be a woven or a non-woven fabric. As used herein, the terms "composite fiber" and "composite fabric" refer to fibers and fabrics formed of composite materials.

As described hereinafter, in one aspect the present disclosure relates to recycling composite materials from production through end-of-life of composite products. The recycled composite materials may be sourced from fiber manufacturing, fabric manufacturing, composite manufacturing, component manufacturing, and/or end-of-life composite products. For example, composite fiber and fabric manufacturing may have 10% yield loss of raw materials. Examples of waste from fiber or fabric manufacturing may be dry waste in the form of loose fibers or fabric and may be wet waste in the form of prepregs. Similarly, composite manufacturing is known to have at least 20% yield loss of materials. Examples of waste from composite manufacturing may be in the form of fabric selvage, prepregs, fiber, and extra fabric each of which may be dry waste or wet waste. The yield loss from fiber manufacturing, fabric manufacturing, and composite manufacturing is considered waste and is typically directed to a landfill. Moreover, at the end-of-life of composite products, the product is considered to be 100% waste which is all directed to a landfill. Examples of end-of-life composite products includes, but is not limited to, airplane parts including wings and fuselages, vehicles, sports equipment, boats, and windmills including blades and housings. Thus, the production of composite products may result in a significant amount of waste and the composite products produced are considered fully waste at the end-of-life. As such, there is a need for processes for recycling composite materials and products constructed thereof to prevent or reduce the amount of composite material waste that is directed to landfills or otherwise disposed.

An example of waste from production of a composite product is shown in FIG. 1. Composite products are typically produced from a roll of composite fabric having a uniform width and from which portions thereof are cut out to define the desired shape of a part. As a result of the parts produced from the composite fabric do not necessarily define a shape and/or size that matches the roll of composite fabric, carbage may be produces as waste. FIG. 1 illustrates a sheet of composite fabric 100 which may be cut from a roll of composite fabric. As illustrated, when a round piece of composite fabric 102 is cut from the sheet of composite fabric 100, a significant quantity of waste composite fabric 104 may be produced.

Such composite waste has been traditionally viewed as useless and disposed of as trash. This composite waste may end up in landfills. By one estimate, at least 50,000 metric tons of carbon fiber alone is used each year such that a large quantity of carbon fiber is being disposed of as waste. Notably, carbon fiber is relatively expensive to manufacture, and hence the monetary losses associated with failing to use all of the carbon fiber and disposing of the unused scrap materials may be significant. It is noted that carbon fiber is only one type of composite material that may be used to produce composite products within the scope of this disclosure. For example, many aramids and meta-aramids may also be expensive to manufacture.

In light of the significant quantity of waste composite materials being produced, methods for recycling composite materials have been sought. Known methods view the waste composite materials as being unsuitable for use in composite products without first processing the waste composite materials in some manner. For example, many methods for recycling composite materials involve forming the waste composite materials into a nonwoven fabric. In order to form the nonwoven fabric, the waste composite fabrics may be cut into short lengths (e.g., less than 1 inch, and usually less than ½ inch) and directed through a carding machine such that the composite fibers are relatively uniform in length and consistency and suitable as an input for a nonwoven machine. An example embodiment of a nonwoven material 200 is illustrated in FIG. 2.

However, as a result of the cutting operation, composite products produced from the nonwoven material may define substantially reduced strength as compared to composite products produced from the original, continuous composite fabric. In this regard, the continuous filaments in the original composite fabric may provide significantly more strength as compared to the relatively short fibers in the nonwoven material as a result of the cutting operation performed thereon.

Other methods for recycling composite materials have been explored. Such methods often involve the application of heat (e.g., pyrolysis) or chemicals (e.g., solvolysis) to recover the composite materials from wet waste. Specifically, the heat or chemicals are used to remove resin from wet waste such that the composite materials are now considered dry waste. However, usage of heat and/or chemicals may increase the costs and complexity associated with recycling the wet waste. Additional methods for recycling carbon fiber are described, by way of example, in Pimenta S, Pinho ST, 2011, Recycling carbon fibre reinforced polymers for structural applications: Technology review and market outlook, *WASTE MANAGEMENT*, Vol: 31, Pages: 378-392, ISSN: 0956-053X.

Further, while not specifically mentioned above, the methods of recycling composite materials detailed above include separating the composite materials from other components. For example, when a windmill blade is recycled, the composite materials forming the skin of the windmill blade is separated from other components and materials that may include foam, wood, metal, or paint. Separating the composite materials may prevent inclusions of materials such as foam, wood, or metal from being included in the composite materials forming the wet waste.

Accordingly, embodiments of the present disclosure are directed to methods for recycling composite materials that may not suffer from the drawbacks associated with known composite material recycling techniques. In this regard, embodiments of the present disclosure may provide a simplified process for forming composite products from recycled material including composite materials that do not require additional processing of the composite materials, an additional cutting operation, or the application of heat or chemicals in order to prepare composite material scraps for usage in the formation of a composite product. Further, the composite products may define improved strength characteristics as compared to other embodiments of composite products formed from recycled composite materials. The recycled composite materials may be used without a separating or sorting process to remove the composite materials from materials which may form inclusions.

According to embodiments of the present disclosure, composite products may be formed in a static mold or may be formed on a continuous two belt press. A static mold may be referred to generally as a mold. As may be understood, the particular shape of the mold may vary depending on the desired shape of the final composite product. A mold 300 according to an example embodiment of the present disclosure is illustrated in FIG. 3. In embodiments, the mold 300 may include a first portion 302 configured to receive one more materials such that the materials take on a shape defined by the first portion 302. In some embodiments the mold 300 may further comprise a second portion 304. The second portion 304 of the mold 300 may cooperate with the first portion 302 of the mold 300 to define a product having a desired shape. The mold 300 may be a static compression mold.

In some embodiments, the mold 300 is configured to receive a plurality of material scraps 306. The material scraps 306 may be produced from recycled composite materials from fiber manufacturing, composite manufacturing, and/or end-of-life of composite products. For example, the material scraps 306 may be provided as a woven fabric 306A, as a plurality of loose fibers 306B, or as a plurality of chips or shards of wet waste. FIG. 4 illustrates a perspective view of an example piece of woven fabric 306A. The piece of woven fabric 306A may include carbon fibers and/or fiberglass fibers. In some embodiments the woven fabric 306A may comprise selvage material, resulting from trimming one or more edges of a sheet of woven fiber fabric to define a desired shape, and the selvage material may be recycled via the methods disclosed herein. Further, FIG. 5 illustrates a perspective view of an example piece of loose fibers 306B. In some embodiments, the loose fibers 306B may be waste carbon fibers and/or waste fiberglass fibers from production of woven or non-woven fabric. Thus, in some embodiments the material scraps 306 may be derived from dry waste from composite manufacturing. Thereby, the material scraps 306 may exhibit flexibility, which may assist in formation of the material scraps into a desired shape in the mold 300.

In some embodiments, the material scraps 306 may not be subjected to certain processing operations after being cut from the base material (e.g., a sheet of woven fabric or thread) and prior to placement in the mold 300. In particular, the material scraps 306 may not be heated or chemically treated prior to placement in the mold 300. Specifically, any material scraps 306 that are considered wet waste may include an initial resin with the initial resin remaining in the final composite product formed from the material scraps 306. Further, the material scraps 306 may not be subjected to any cutting operations between separation from the initial materials comprising continuous fibers. In other words, the material scraps 306 may not be subjected to any cutting operations following separation from the initial fiber materials during production of an initial product. Thus, for example, in embodiments in which the material scraps 306 comprise woven fabric 306A, the material scraps may not be cut again after being separated from a sheet of woven fabric. By way of further example, in embodiments in which the material scraps 306 comprise loose fibers 306B, the material scraps may not be cut again after being separated from the thread employed in the production of woven fabric.

In contrast, as noted above, traditional composite recycling techniques cut material scraps into small pieces having fibers defining a length typically less than about one inch. In this regard, some traditional composite recycling techniques produce nonwoven fabrics. Production of nonwoven fabrics may require a continuous web of disentangled, cleaned, and intermixed fibers. Such a continuous web may be produced by cutting and carding the scrap materials.

Thus, as a result of the cutting operation, traditional recycled composite materials may be formed from relatively short fibers (e.g., defining a length less than about one inch). In contrast, the recycled composite materials produced from the processes disclosed herein may be formed from material scraps having composite defining relatively longer lengths. In this regard, the material scraps 306 may not be cut again following separation from the initial composite materials.

As noted above, the mold 300 may be configured to receive the material scraps 306 therein. The material scraps 306 may be positioned in the mold 300 to at least partially overlap one another. For example, FIG. 6 illustrates overlapping material scraps 306 comprising woven fabric 306A. As may be understood, the material scraps 306 may additionally or alternatively comprise loose fibers 306B. As a result of the overlapping configuration, the material scraps 306 may define a substantially continuous layer 308, as illustrated in FIG. 3, which may be compacted when the first portion 302 and the second portion 304 of the mold are engaged.

Further, a resin 310 may be applied to the material scraps 306 in the mold 300. The resin 310 may be applied to the material scraps 306 in any of various manners including spraying, coating, brushing, etc. In some embodiments the resin 310 may be applied to the material scraps 306 before the first portion 302 and the second portion 304 of the mold 300 are brought into engagement. In embodiments, the first portion 302 and the second portion 304 of the mold 300 may be brought into engagement before the resin 310 is applied to the material scraps 306.

After the resin 310 cures, the resin 310 and the material scraps 306 may define a composite product 312, as illustrated in FIG. 7. As illustrated in FIG. 8, the composite product 312 may be removed from the mold 300 (see, e.g., FIG. 7) and retain the shape provided by the mold 300. Thereby, the composite product 312 may define a shape-stable structure. As noted above, some, most, or all of the composite materials included in the composite product 312 may define a length greater than one inch, which may provide the composite with greater strength than corresponding composites formed from nonwoven composite fabric.

In the embodiment described above, the composite product 312 comprises a single substantially continuous layer 308 of the scrap materials 306 and the resin 310. As illustrated in FIG. 9, the resin 310 may also be positioned at one or more exterior surfaces in order to protect the composite materials in the substantially continuous layer 308 comprising the material scraps 306 (see, e.g., FIG. 3). However, as may be understood, the substantially continuous layer 308 may extend to one or more outer surfaces in other embodiments.

Further, as illustrated in FIG. 10, in some embodiments the composite product 312 may comprise one or more additional layers 314, 316. The resin 310 may be applied between each layer, or the resin 310 may be applied on top of the plurality of layers and allowed to seep therein. In some embodiments a negative pressure may be applied to the mold 300 in order to cause penetration of the resin into the one or more layers in any of the embodiments disclosed herein. Note that although a particular ordering of the layers 308, 314, 316 and the resin 310 is illustrated in FIG. 10, this ordering may be rearranged in any of various manners. Note further that although two additional layers 314, 316 are shown, fewer layers or a greater number of layers may be included in the composite product 312 in other embodiments.

In one embodiment one or more of the additional layers 314, 316 may be formed from carbon fiber materials. For example, one or more of the additional layers 314, 316 may comprise additional scrap materials 306 comprising composite materials. By way of further example, an additional layer may comprise one or both of woven fabric 306A and loose fibers 306B (see, e.g., FIG. 3).

In another embodiment, one or more of the additional layers 314, 316 may comprise composite materials in a differing form. For example, in one embodiment a plurality of pre-impregnated composite chips 318 (FIG. 11) may define one or more of the additional layers 314, 316. Thus, in some embodiments the material scraps may be wet waste that have already received resin and may themselves already define a composite. The pre-impregnated composite chips 318 may be positioned such that they at least partially overlap one another to define a second substantially continuous layer. In some embodiments the second substantially continuous layer may comprise an outer layer, which refers to a layer of the composite product 312 having either only the resin, or nothing, between the layer and the outer surface of the composite. Thereby, in some embodiments the pre-impregnated composite chips 318 may be visible, which may provide a pleasing appearance.

In another embodiment, one or more of the additional layers 314, 316 may comprise a different material. For example, one or more of the additional layers 314, 316 may comprise an aramid layer, a meta-aramid layer, a fiber glass layer, a foam layer, or any other layer of material.

The composite product 312 may define any of a variety of shapes and forms. Examples of composite products 312 include, but are not limited to, vehicle and trailer components such as floors, walls, ceilings, and components of recreational vehicles; walls, floors, doors, and ceilings of shipping containers; counter tops; tiles for flooring or walls; building panels; storm barrier panels; and as a plywood replacement such as roofing underlayment, subfloors, and cladding.

With respect to shipping container panels, the composite product may be relatively lightweight as compared to the materials traditionally employed therein. For example, shipping container floors are typically formed from wood, which may be relatively heavy. Accordingly, shipping costs may be reduced by employing the composite product 312. In some embodiments, the composite product 312 may be attached (e.g., via fasteners such as screws) to a traditional shipping container floor such as plywood to define an outer surface (e.g., a top surface) thereof that is exposed to the products and materials undergoing shipment. In this regard, as a result of the resin 310, the composite product 312 may be relatively easy to clean as compared to plywood. Similarly, storm barrier panels, which may for example cover and protect windows during hurricanes or other inclement weather, are typically formed from plywood, and hence the relatively light weight of the composite product 312 may provide benefits in terms of ease of installation thereof. Further, countertops are often formed from heavy stones and other materials that may be relatively expensive to ship and difficult to install in comparison to countertops formed from the composite product 312.

Further, as a result of the composite product 312 including the resin 310, the composite product 312 may define a substantially sealed, fluid impervious structure, which may avoid issues with respect to insect infestation and contamination from bacteria and viruses, etc. In contrast, materials such as wood employed in shipping container panels may require extensive sanitary treatments, especially when undergoing international transport to avoid introducing foreign insects into a given location. Similarly, materials such as stone employed in countertops are naturally porous and fluid pervious and may thereby require sealing to facilitate cleaning thereof and avoid contamination, whereas the composite product 312 may not require application of any sealant thereto. Accordingly, the composite product 312 may define benefits as compared to other materials, particularly when configured as one of the products described herein.

FIG. 12 schematically illustrates a method for forming a composite product. As illustrated, the method may include providing a resin at operation 402. Further, the method may include providing a plurality of material scraps respectively comprising a plurality of fibers at operation 404. The material scraps may be provided as a woven fabric and/or a plurality of loose fibers. The method may additionally include positioning the material scraps in a mold such that the material scraps at least partially overlap one another and define a substantially continuous layer at operation 406. The method may also include adding the resin to the material scraps 408 and hardening the resin in the mold at operation 410.

In some embodiments the method may further comprise providing a plurality of pre-impregnated composite chips. The method may also include positioning the pre-impregnated composite chips in the mold such that the pre-impregnated composite chips at least partially overlap one another and define a second substantially continuous layer. Additionally, the method may include adding the resin to the pre-impregnated composite chips.

In some embodiments positioning the pre-impregnated composite chips in the mold may comprise positioning the pre-impregnated composite chips such that the second substantially continuous layer is an outer layer. Further, the method may include positioning at least one of a carbon fiber material, an aramid material, a meta-aramid material, or a fiberglass material in the mold to define a strengthening layer and adding the resin to the strengthening layer.

In some embodiments providing the material scraps at operation 404 may include retaining the material scraps in an initial size and shape associated with formation of the material scraps. Hardening the resin in the mold at operation 410 may include forming a shipping container panel, a countertop, or a storm barrier panel. Providing the material scraps at operation 404 may comprise providing the fabric and the loose fibers.

In an additional aspect another embodiment of a composite is provided. As illustrated in FIG. 13, the composite product 500 may include a resin 502 and a plurality of fibers 504. The resin 502 may comprise a thermoset resin or a thermoplastic resin. The fibers 504 may be provided as a nonwoven fabric. By way of example only, the fibers 504 may be provided as a wet-lay nonwoven fabric. An example embodiment of a wet-lay nonwoven fabric 506 comprising fibers 504 is illustrated in FIG. 14. In some embodiments the fibers 504 may be recycled. In this regard, the fibers 504 (e.g., fabric scraps or loose fibers) may be cut and directed through a carding machine.

Nonwoven fabrics may be alternatively formed via a needle-punch method. An example embodiment of a needle-punch nonwoven fabric 508 comprising fibers 504 is illustrated in FIG. 15. However, nonwoven fabrics formed via a needle-punch method typically define an increased volume of open voids as compared to wet-lay nonwoven fabric. The open voids may tend to absorb resin, thereby rendering a composite comprising the needle-punch nonwoven fabric 508 relatively heavier than a composite formed from the wet-lay nonwoven fabric 506. Accordingly, it may be desirable to employ wet-lay nonwoven fabric 506 in the composite product 500. Regardless of the type of nonwoven fabric employed, the composite product 500 may benefit from inclusion of the fibers 504 in that these fibers may provide enhanced impact resistance.

In this regard, FIG. 16 illustrates an embodiment of the composite product 500 including a layer of the wet-lay nonwoven fabric 506 comprising fibers 504 and one or more additional layers 510, 512. The additional layers 510, 512 may comprise one or more of any other materials employed in composites such as carbon fibers, glass fibers, glass microspheres, Kevlar® fibers, foam, prepreg carbon fibers, aramid fibers, meta-aramid fibers, and basalt fibers.

Although the layers 506, 510, 512 are shown in a particular example order, it should be understood that various other configurations may be employed in other embodiments, and a greater or lesser number of layers may be employed. However, it may be preferable to provide the wet-lay nonwoven fabric 506 comprising the fibers 504 as an outer layer in order to take advantage of the impart resistance provided by this layer, which may protect other layers. Thus, for example, the wet-lay nonwoven fabric 506 comprising fibers 504 may be employed in a boat hull, and one or more of the additional layers 510, 512 may comprise fiberglass, which may be protected from impact by other fibers.

FIG. 17 illustrates a method for forming a composite according to an additional example embodiment of the present disclosure. As illustrated, the method may include forming a plurality of fibers into a nonwoven fabric at operation 602. Further, the method may include positioning the nonwoven fabric and a resin in a mold at operation 604. Additionally, the method may include curing the resin in the mold at operation 606.

In some embodiments, forming the fibers into the nonwoven fabric at operation 602 may include forming the fibers into a wet-lay nonwoven fabric. Positioning the nonwoven fabric and the resin in the mold at operation 604 may include positioning the wet-lay nonwoven fabric and the resin in the mold. Positioning the nonwoven fabric in the mold at operation 604 may include forming an outer layer with the nonwoven fabric.

Referring now to FIGS. 18 and 19, a schematic of an apparatus 350 for manufacturing a composite product is provided in accordance with the present disclosure. The apparatus 350 includes a mold 352 and a die 354. The mold 352 at least partially defines a cavity 356 that is sized to have dimensions of the finished composite product. As shown in FIG. 18, the apparatus 350 is in an open configuration in which the die 354 is spaced apart from the mold 352 such that wet waste, dry waste, or resin can be added into the cavity 356 of the mold 352.

As shown in FIG. 19, the apparatus 350 is in a press or closed configuration in which a head 358 of the die 354 is at least partially positioned within the cavity 356. As the head 358 enters the cavity 356, the head 358 may compress wet waste, dry waste, and/or resin within the cavity 356.

As shown in FIG. 20, an apparatus 450 may be used to form the composite products detailed herein. The apparatus 450 is a two-belt press that includes a first belt 452 and a second belt 454. The two-belt press 450 may be provided with one or mixers 456 and one or more scattering units 458. In use, material is mixed in the mixers 456 and provided to the scattering units 458. The scattering units 458 dispense or spread a layer of material on the first belt 452. The scattering units 458 may be configured to scatter a substantially uniform layer of material on the first belt 452 as the first belt 452 advances. The first belt 452 may continuously advance or may advance in discrete steps. When a composite product formed with the two-belt press 450 has a single layer, a single mixer 456 and scattering unit 458 may be used. When a composite product formed with the two-belt press 450 includes multiple layers, multiple mixers 456 and scattering units 458 may be used. For example, a first scattering unit 458a may dispense a first or base layer of a composite product directly onto the first belt 452, a second scattering unit 458b may dispense a second or core layer directly onto the base layer, and a third scattering unit 458c may dispones a top layer directly onto the core layer. The first, second, and third scattering units 458a-c may be arranged sequentially along the first belt 452. In some embodiments, the two-belt press 450 may be used to form a composite product with more than three layers. For example, an intermediate layer of dry waste may be disposed on the core and another core layer may be disposed on the intermediate layer before the top layer is dispensed.

The second belt 454 is disposed above the first belt 452 at a declining height such that as material on the first belt 452 passes under the second belt 454, the second belt 454 applies pressure to the material to compress the material on the first belt 452. The first belt 452 may have edges or walls 453 and the second belt 454 may substantially fit within the walls 453 such that material on the first belt 452 is prevented from spreading beyond the walls 453 and is compressed between the first belt 452 and the second belt 454. The second belt 454 may have a linear speed substantially equal to the first belt 452. In certain embodiments, the linear speed of the second belt 454 may be slightly different than the linear speed of the first belt 452 such that additional compression is applied to materials on the first belt 452. The pressure applied to the material on the first belt 452 may be similar to the apparatus 350 detailed above, e.g., in a range of 5 psi-1000 psi. The two-belt press 450 may be used to continuously form a composite product similar. The two-belt press 450 may include an oven or apply heat to the material disposed on the first belt 452 before, during, or after the material is compressed between the first belt 452 and the second belt 454.

For the purposes of this disclosure and claims, the first belt 452 may be considered to form a cavity on the top surface thereof. When the first belt 452 includes walls 453, the cavity may be a space defined between the walls 453 and may extend above the walls 453. For example, as shown in FIG. 20, the material dispensed by the scattering units 458 is disposed into a cavity defined on the top surface of the first belt 452.

With reference to FIG. 21, another method of manufacturing a composite product is provided in accordance with the present disclosure and is referred to generally as method 700 and is described with reference to the apparatuses 350, 450 of FIGS. 18-20. The composite product may be formed from wet waste, dry waste, or a combination of wet waste and dry waste. Examples of some of the products formed by the method 700 may include, but are not limited to, composite products 900, 900', and 900" of FIGS. 23-25.

When wet waste is used as an ingredient for the composite product, the wet waste may be processed as detailed in process 710. The wet waste is provided or obtained as fibers, fabrics, or products that include composite material with cured or uncured initial or first resin (Step 714). In some embodiments, the wet waste is a composite product that has reached its end of life. In certain embodiments, the wet waste is a composite material with cured or uncured resin applied thereto from manufacturing of composite products. The wet waste is then ground or shredded into a powder, small chips, shards, or other particulated material (Step 716). The wet waste may be ground until the wet waste has a desired size. The desired size may be dust, shards, pellets, or chips of less than 2 inches, e.g., less than 1 inch, less than 0.5 inches, less than 0.25 inches, or less than 0.125 inches. In some embodiments, the ground or particulated wet waste may be separated into different size ranges such that wet waste below a desired range may be removed such that all wet waste is in a desired range, e.g., in a range of 0.125 inches to 1 inch (Step 718). In certain embodiments, a composite product may be cut or chopped to an initial size and then ground in Step 716. For example, a windmill blade may be cut or chopped to a size to make transport possible or easier from an installed location to a location for final grinding. In certain embodiments, the ground or particulated wet waste may be formed by chopping and cutting but without what would be traditionally referred to as grinding. The composite product at end of life may be ground with non-composite materials included in the ground wet waste. The non-composite materials may be considered inclusions and may include foam, wood, plastics, metals, resin, or other elements included in the composite product formed of the method 700.

When dry waste is used as an ingredient for the composite product, the dry waste may be processed as detailed in process 720. The dry waste is provided or obtained as fibers or fabrics that have not been exposed to resin (Step 724). The dry waste may be chopped or cut to length (Step 726). The dry waste may be chopped to a length in a range of 2 inches to 12 inches, e.g., in a range of 3 inches to 6 inches. When the dry waste is in the form of fabric, the dry waste may also be chopped or cut to a desired width (Step 728). The desired width may be in a range of 0.625 inches to 3 inches depending on the application, e.g., 0.125 inches to 0.25 inches. In some embodiments, the dry waste is included without further processing, e.g., without cutting or chopping. In certain embodiments, the dry waste may be carded to remove fibers from fabric or to orient the fibers.

With the wet waste and the dry waste processed, the wet waste and dry waste are layered in a mold 352 as detailed in process 730. The mold 352 may be similar to the mold 352 shown in FIGS. 18 and 19, the mold may be a flat mold, or the mold may have a shape based on the composite product being made. In some embodiments, with the wet waste and the dry waste processed, the wet waste and the dry waste may be layered onto a two-belt press 450 as shown in FIG. 20. The process 730 may include pouring a base layer of resin into the cavity 356 of the mold 352 before adding wet waste or dry waste into the mold 352 (Step 731). The resin of the base layer may be a resin having properties desired for an external layer such as color, texture, hardness, toughness, or finish. The process 730 includes adding a first waste layer of wet waste or dry waste to the mold 352 (Step 732). It should be noted that in some embodiments, the first waste layer of wet waste or dry waste is added to the mold 352 without any resin being in the mold 352. In some embodiments, the first waste layer may be added as a mix of wet waste or dry waste.

The process 730 may include adding a second waste layer of wet waste or dry waste to the mold 352 over the first waste layer of wet waste or dry waste (Step 733). The second waste layer of wet waste or dry waste may be the other of the wet waste or the dry waste of the first waste layer. For example, the first waste layer may be dry waste and the second waste layer may be wet waste. In some embodiments, the first waste layer may be wet waste and the second waste layer may be dry waste. In certain embodiments, the first waste layer may be a first type or size of wet waste and the second waste layer may be a second type or size of wet waste. In particular embodiments, the first waste layer may be a first type or size of dry waste and the second waste layer may be a second type or size of dry waste. When there is a base layer of resin, the first waste layer and/or the second waste layer may sink into and/or absorb some of the resin of the base layer. The first layer and the second layer may have the same thickness or a different thickness based on a composite product being manufactured by the process 730.

The process 730 may include pouring a first resin layer into the cavity 356 of the mold 352 over the first waste layer and/or second waste layer (Step 734). The resin of the first resin layer may penetrate through the first waste layer and/or the second waste layer. In embodiments where there is a base layer of resin, the resin of the first resin layer may bond to or merge with the resin of the base layer. The first resin layer may completely cover the first waste layer and/or the second waste layer. In some embodiments, the first resin layer may only partially cover the first waste layer and/or the second waste layer such that portions of the first waste layer or the second waste layer may extend through the first resin layer.

The process 730 may include a plurality of waste layers before pouring the first resin layer. For example, the process 730 may include a first waste layer, a second waste layer, a third waste layer, and a fourth waste layer that are sequentially layered on top of one another until a desired number of layers are disposed within the mold 352. The first layer of resin may penetrate through and be absorbed by each of the plurality of layers such that the plurality of layers are bonded together by the first layer of resin.

In some embodiments, the process 730 includes adding a third waste layer of wet waste or dry waste to the mold over the first resin layer (Step 735). In some embodiments, the third waste layer may be added as a mix of wet waste or dry waste. The process 730 may include laying a fourth waste layer of wet waste or dry waste to the mold over the third waste layer of wet waste or dry waste (Step 736). The fourth waste layer of wet waste or dry waste may be the other of the wet waste or the dry waste of the third waste layer. For example, the third waste layer may be dry waste and the fourth waste layer may be wet waste. In some embodiments, the third waste layer may be wet waste and the fourth waste layer may be dry waste. In certain embodiments, the third waste layer may be a first type or size of wet waste and the fourth waste layer may be a second type or size of wet waste. In particular embodiments, the third waste layer may be a first type or size of dry waste and the fourth waste layer may be a second type or size of dry waste. When there is a base layer of resin, the third waste layer and/or the fourth waste layer may sink into and/or absorb some of the resin of the base layer. The first layer and the second layer may have the same thickness or a different thickness based on a composite product being manufactured by the method 700. The third waste layer and the fourth waste layer may sink into or absorb resin of the first resin layer. In some embodiments, the third waste layer and/or the fourth waste layer may extend above the resin of the first resin layer.

The process 730 may include pouring a second resin layer over the third waste layer and/or the fourth waste layer (Step 737). The resin of the second resin layer may penetrate through the third waste layer and/or the fourth waste layer and bond to or merge with the first resin layer. In embodiments where there is a base layer of resin, the resin of the second resin layer may bond to or merge with the resin of the base layer. The second resin layer may completely cover the third waste layer and/or the fourth waste layer. In some embodiments, the second resin layer may only partially cover the third waste layer and/or the fourth waste layer such that portions of the third waste layer or the fourth waste layer may extend through the second resin layer.

The process 730 may include compressing the waste and resin layers positioned in the mold 352 with a die 354 (Step 738). The die 354 may be flat or curved depending on the final form of the composite product being produced by the process 730. As the die 354 is pressed into the waste and resin layers positioned within the mold, the die 354 may increase a pressure within the waste and resin layers such that the resins penetrate through the waste layers and may penetrate into pieces or shards of the dry waste or the wet waste. Compressing the waste and resin layers may urge air captured within the cavity of the mold to leave the cavity of the mold. Compressing the waste and resin layers may at least partially mix the plurality of layers of waste. The die 354 may be pressed into the waste and resin layers to apply at least 500 pounds per square inch (psi). In some embodiments, the die 354 may be pressed into the waste and resin layers to apply greater than 500 psi, e.g., 1000 psi. In certain embodiments, the die 354 may be pressed into the waste and resin layers to apply between 5 to 1,000 psi, e.g., 16, 60, 160, or 500 psi.

After the layers are compressed by the die, a surface layer of resin may be poured over the compressed layers to form a top layer of the composite product (Step 739). The top layer may have a desired color, texture, hardness, toughness, or finish for the finished composite product. The resin of the surface layer may bond to or merge with the resins of the compressed layers. The layers, including the surface layer, may be compressed again with the die 354 after the top layer is poured over the compressed layers (Step 741).

The process 730 includes curing the resins such that the layers of resin and layers of waste from a unitary composite product (Step 742). The resins may be cured under pressure (e.g., when being compressed by the die 354), may be cured under negative pressure (e.g., vacuum), or may be cured at atmospheric pressure. The resins may be cured using light, temperature, pressure, chemistry, or combinations thereof. The resins may be cured within the cavity of the mold or may be cured outside of the cavity of the mold. The resins added during process 730 may be considered added or second resins.

When the two-belt press 450 is used to form the composite product, the process 730 may be completed with sequential stations along the two-belt press instead of discrete steps such that production of the composite product may be continuous as the belts of the two-belt press 450 are advanced. The two-belt press 450 may be used to continuously form the composite product. When a two-belt press 450 is used, the composite product may be cut to length after the second resin is cured. The composite product may be cut to length with a mechanical cutter, e.g., a saw or blade, or a laser cutter.

Referring now to FIG. 22, another method of manufacturing a composite product is disclosed in accordance with the present disclosure and is referred to generally as method 800 and is described with reference to the apparatuses 350, 450 of FIGS. 18-20. The composite product may be formed from wet waste, dry waste, or a combination of wet waste and dry waste. Examples of some of the products formed by the method 800 may include, but are not limited to, composite products 900, 900', and 900" of FIGS. 23-25. Method 800 includes process 710 and process 720 detailed above with respect to method 700. As such, processes 710 and 720 will not be detailed again for brevity.

Once the dry waste and the wet waste is processed, method 800 includes process 830 of manufacturing a composite product from a homogenous mixture of waste and resin. The resin or resins used in Process 830 are considered added or second resins. Process 830 includes adding mixing dry waste, wet waste, or resin in a vessel, e.g., mixer, to form a homogenous mixture of waste and resin (Step 832). The recipe for the properties and amounts of dry waste and wet waste may be specific to the composite product being manufactured by the process 830.

In embodiments, the homogenous mixture includes wet waste and resin. In some embodiments, the homogenous mixture include wet waste, dry waste, and resin. The dry waste may be in the form of fibers or fabric. The dry waste may act as reinforcement to the wet waste and the resin.

Once the homogeneous mixture is formed, the homogeneous mixture is poured into a cavity 356 of a mold 352 having the shape of the composite product being manufactured (Step 834). In certain embodiments, a scatterer is used to distribute the homogenous mixture into the mold 352. With the homogenous mixture in the cavity 356 of the mold 352, a die 354 may be used to compress the homogenous mixture within the cavity (Step 838). The die 354 may be flat or curved depending on the final form of the composite product being produced by the process 830. As the die 354 is pressed into the homogenous mixture positioned within the mold 352, the die 354 may increase a pressure within the homogenous mixture such that the resin penetrates into pieces or shards of the dry waste or the wet waste. Compressing the homogenous mixture may urge air captured within the cavity of the mold to leave the cavity of the mold. The die 354 may be pressed into the homogenous mixture to apply at least 500 pounds per square inch (psi). In some embodiments, the die may be pressed into the homogenous mixture to apply greater than 500 psi, e.g., 1000 psi. In certain embodiments, the die 354 may be pressed into the waste and resin layers to apply between 5 to 1,000 psi, e.g., 16, 60, 160, or 500 psi.

In some embodiments, the method 800 includes applying a base layer into the mold 352 before applying the homogenous mixture to the mold 352. The base layer may be a layer of dry waste. For example, the base layer may be layer of composite fibers or composite fabric. The base layer may be dry waste, virgin material, or a combination thereof. The base layer may have new resin applied thereto and/or may receive resin from the homogenous mixture applied thereto. The base layer may be configured to provide a visually appealing surface to the composite product. In certain embodiments, the base layer may be colored or finished. In certain embodiments the base layer receives a resin configured to be visually appealing or provide an aesthetic surface finish.

In certain embodiments, the method 800 includes applying a top layer into the mold 352 over the homogenous mixture after applying the homogenous mixture to the mold 352. The top layer may be a layer of dry waste. For example, the top layer may be layer of composite fibers or composite fabric. The top layer may be dry waste, virgin material, or a combination thereof. The top layer may have new resin applied thereto and/or may receive resin from the homogenous mixture applied thereunder. The top layer may be configured to provide a visually appealing surface to the composite product. The top layer may have the same or different surface than the base layer. In certain embodiments, the top layer may be colored or finished. In certain embodiments, the top layer receives a resin configured to be visually appealing or provide an aesthetic surface finish. The resin of the top layer may be different than the resin of the base layer.

The process 830 includes curing the resins such that the layers of resin and layers of waste from a unitary composite product (Step 842). The resins may be cured under pressure (e.g., when being compressed by the die 354), may be cured under negative pressure (e.g., vacuum), or may be cured at atmospheric pressure. The resins may be cured using light, temperature, pressure, chemistry, or combinations thereof. The resins may be cured within the cavity of the mold or may be cured outside of the cavity of the mold.

The second resin or resins used in the Processes 730 and 830 may be thermoset or a thermoplastic resin. The second resins may include, but are not limited to, urethane resins, acrylic resins, phenolic resin, polyester resin, vinyl ester resin, epoxy resin, thermoplastic resin, or combinations thereof. The resins may be wet resins or dry resins. The second resins may be provided as powder, pellets, or sheets. When multiple resins are used in the process 730, each of the resins should be compatible with one another such that the composite product formed is of unitary construction. Depending on the resins used, the composite product may be fire resistant. For example, when a phenolic resin is used, the composite product may be fire resistant. In embodiments where the appearance or strength of the surface is important, an epoxy resin may be used. Overall, the second resin may be selected based on a particular use of the end panel based on attributes of the resin, the cost of the resin, or attributes of the resin.

The composite products manufactured by the processes 730, 830 may include, but are not limited to, vehicle and trailer components such as floors, walls, ceilings, and components of recreational vehicles; walls, floors, doors, and ceilings of shipping containers; counter tops; tiles for flooring or walls; building panels; storm barrier panels; and as a plywood replacement such as roofing underlayment, subfloors, and cladding. The composite products manufactured by the processes 730, 830 may include 60% wet composite waste and dry waste and 40% new resin. In some embodiments, the composite products manufactured by the processes 730, 830 comprise 0-95% wet composite waste, 0-90% dry waste, and 5-50% new resin. As used herein, "new resin" or "second resin" refers to resin that is added in addition to any cured or uncured resin included in the wet composite waste.

Referring now to FIG. 23, a composite product 900 is provided in accordance with embodiments of the present disclosure. The composite product 900 includes a homogenous mixture 910 of wet waste 911 and a new resin 918 that is cured. The composite product 900 may include inclusions 912, 914, 916 of non-composite materials that were included in the wet waste that was ground in Process 710. The inclusions 912, 914, 916 may be formed of wood, foam, metal, or other non-composite materials. The inclusions 912, 914, 916 may all be the same type of material or may be different materials. In the composite product 900, the homogenous mixture 910 substantially forms the top and bottom surfaces of the composite product 900.

With reference to FIG. 24, a composite product 900' is provided in accordance with embodiments of the present disclosure. The composite product 900' includes a homogenous mixture 910' of wet waste 911, a new resin 918, and dry waste 913. The dry waste 913 may be in the form of fibers and/or fabric. The dry waste 913 may reinforce the homogenous mixture 910' to provide additional strength, toughness, or wear resistance as compared to a homogenous mixture 910 formed of similar wet waste 911 and new resin 918. The composite product 900' may include inclusions 912, 914, 916 similar to the inclusions 912, 914, 916 detailed above. In the composite product 900', the homogenous mixture 910' substantially forms the top and bottom surfaces of the composite product 900'.

With reference to FIG. 25, a composite product 900" is provided in accordance with embodiments of the present disclosure. The composite product 900" includes a homogenous mixture 910' and a base layer 921 and/or a top layer 923. As shown, the homogenous mixture 910' includes wet waste 911, a new resin 918, and dry waste 913. However, in some embodiments, the homogenous mixture 910' may not include dry waste 913 such that the homogenous mixture of this composite product 900" may be similar to homogenous mixture 910. The homogenous mixture 910' may include inclusions 912, 914, 916 similar to the inclusions 912, 914, 916 detailed above. The base layer 921 and the top layer 923 may be formed of virgin or recycled material. For example, dry waste or virgin material in the form of fibers and/or fabric may be used to from the base layer 921 and/or the top layer 923. The base layer 921 and/or the top layer 923 may absorb resin from the homogenous mixture 910' or may have separate new resin applied thereto that is compatible with the new resin of the homogenous mixture 910'. The base layer 921 may form the bottom surface of the composite product 900" and the top layer 923 may from the top surface of the composite product 900".

As noted above, the composite products 900, 900', and 900" may be formed of any of the methods detailed herein. Other composite products may be formed with the methods detailed herein. For example, a composite product with a first core formed of a homogenous mixture and a second core formed of the same or different homogenous mixture may be formed with an intermediate layer of fabric or fiber (dry waste or virgin) between the first core and the second core. Such a composite product may also include a base layer and/or a top layer. It will be appreciated that the composite products detailed herein are formed with one or more new resins that are compatible with one another such that the composite products detailed herein are of monolithic or unitary construction and may have substantially homogenous cross-sections or may have heterogenous layers in cross-section. As used herein, the terms "unitary" and "monolithic" mean undividable or whole formed of a single piece without joints or seams to form a single unit.

The composite products detailed herein may be formed of wet waste and/or dry waste the composite products detailed herein may be used as a replacement for plywood and particle board in several applications. For example, as a building panel, a roofing underlayment, a subfloor, or cladding. The composite products detailed herein may have advantages over plywood, particle board, and other materials. For example, the composite products detailed herein may be anti-microbial, rot resistant, insect resistant, water resistant, weather resistant, and/or fire resistant. Further, the composite products detailed herein may have improved impact resistant, improved load bearing, and/or greater wear resistance when compared to plywood or particle board. As such, when the composite products detailed herein are used as a plywood or particle board replacement, the composite products may be thinner and/or lighter when compared to a plywood or particle board having the same strength characteristics. The composite products detailed herein may be considered green products as the composite products are made substantially from waste materials and provide a use for waste materials which would otherwise be landfilled.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:

1. A method of manufacturing a composite product, the method comprising:
   recovering a wet composite waste from at least one of a manufacturing process or an end-of-life product, the wet composite waste including a first resin and a plurality of first fibers bound together with the first resin;
   grinding the wet composite waste after recovering the wet composite waste;
   mixing the wet composite waste with a second resin into a homogenous mixture;
   placing the homogenous mixture into a cavity; and
   curing the second resin of the homogenous mixture such that the homogenous mixture hardens to form a composite product including the first resin, the second resin, and the plurality of first fibers.

2. The method of manufacturing according to claim 1, wherein mixing the wet composite waste with the second resin includes adding dry composite waste such that the homogenous mixture includes the wet composite waste, the dry composite waste, and the second resin.

3. The method of manufacturing according to claim 1, further comprising placing a base layer into the cavity before placing the homogenous mixture into the cavity, the base layer being formed of a plurality of fibers in fiber or fabric form.

4. The method of manufacturing according to claim 3, further comprising recovering dry composite waste, and placing the base layer includes placing the recovered dry composite waste into the cavity.

5. The method of manufacturing according to claim 3, further comprising placing a top layer into the cavity over the homogenous mixture after placing the homogenous mixture into the cavity and before curing the second resin.

6. The method of manufacturing according to claim 3, further comprising applying pressure to the homogenous mixture in the cavity before or during curing of the second resin such that the second resin penetrates the base layer.

7. The method of manufacturing according to claim 1, further comprising applying pressure to the homogenous mixture in the cavity before or during curing of the second resin.

8. The method of manufacturing according to claim 7, wherein applying pressure to the homogenous mixture is completed on a two-belt press.

9. The method of manufacturing according to claim 7, wherein applying pressure to the homogenous mixture is completed in a static press.

10. The method of manufacturing according to claim 7, wherein applying pressure to the homogenous mixture includes the pressure being in a range of 5 pounds per square inch to 1000 pounds per square inch.

11. The method of manufacturing according to claim 1, wherein grinding the wet composite waste includes grinding the plurality of first fibers bound together with the first resin and other materials incorporated with the wet composite waste, the other materials incorporated with the wet composite waste including at least one of foam, wood, metal, or paint.

12. The method of manufacturing according to claim 1, wherein grinding the wet composite waste includes grinding the wet composite waste to a desired size in a range of 0.125 inches to 1 inch.

13. The method of manufacturing according to claim 1, wherein recovering the wet composite waste includes the first resin being cured prior to recovering the wet composite waste.

14. The method of manufacturing according to claim 1, wherein mixing the wet composite waste includes the plurality of first fibers including at least one of carbon fibers, glass fibers, glass microspheres, Kevlar® fibers, aramid fibers, meta-aramid fibers, or basalt fibers.

15. The method of manufacturing according to claim 1, wherein curing the second resin to form a composite product includes the composite product being a truck floor, a trailer floor, a shipping container floor, a truck wall, a trailer wall, a shipping container wall, a truck ceiling, a trailer ceiling, or a shipping container ceiling.

16. The method of manufacturing according to claim 1, wherein mixing the wet composite waste includes mixing the wet composite waste and dry composite waste with a second resin into a homogenous mixture, the wet composite waste and the dry composite waste being at least 60 percent of the homogenous mixture.

17. The method of manufacturing according to claim 1, wherein recovering the wet composite waste includes the first resin of the wet composite waste being cured.

18. A method of manufacturing a floor for a trailer or a shipping container, the method comprising:
    grinding a wet composite waste, the wet composite waste including a first resin and a plurality of first fibers bound together with the first resin;
    mixing the wet composite waste with a second resin into a homogenous mixture;
    placing the homogenous mixture into a cavity; and
    curing the second resin of the homogenous mixture such that the homogenous mixture hardens to form a floor for a trailer or a shipping container including the first resin, the second resin, and the plurality of first fibers.

19. The method of manufacturing according to claim 18, wherein mixing the wet composite waste includes the plurality of first fibers including at least one of carbon fibers, glass fibers, glass microspheres, Kevlar® fibers, aramid fibers, meta-aramid fibers, or basalt fibers.

20. A method of manufacturing a composite product, the method comprising:
    recovering a wet composite waste from at least one of a manufacturing process or an end-of-life product, the wet composite waste including a cured first resin and a plurality of first fibers bound together with the first resin;
    grinding the wet composite waste after recovering the wet composite waste;
    mixing the wet composite waste and dry composite waste with a second resin into a homogenous mixture, the wet composite waste and the dry composite waste being at least 60 percent of the homogeneous mixture;
    placing the homogenous mixture into a cavity; and
    curing the second resin of the homogenous mixture such that the homogenous mixture hardens to form a composite product including the first resin, the second resin, and the plurality of first fibers.

* * * * *